United States Patent
Yu et al.

(10) Patent No.: US 10,599,758 B1
(45) Date of Patent: Mar. 24, 2020

(54) GENERATION AND DISTRIBUTION OF COLLABORATIVE CONTENT ASSOCIATED WITH DIGITAL CONTENT

(71) Applicant: Amazon Technologies, Inc., Seattle, WA (US)

(72) Inventors: Wainwright Gregory Siady Yu, Seattle, WA (US); Robert Wayne Roth, Renton, WA (US); Ashish Singh, Seattle, WA (US); Brian David Rosenblat, San Francisco, CA (US); Jeffrey Craig Kunins, Seattle, WA (US); Eric Michael Franklin, Seattle, WA (US); Walter Manching Tseng, Bellevue, WA (US); Seth Gershom Goldstein, San Francisco, CA (US); Otis Yeager Chandler, San Francisco, CA (US); Andrew Olcott, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 318 days.

(21) Appl. No.: 14/675,582

(22) Filed: Mar. 31, 2015

(51) Int. Cl.
*G06F 17/24* (2006.01)
*H04L 29/08* (2006.01)
(Continued)

(52) U.S. Cl.
CPC ...... *G06F 17/241* (2013.01); *G06F 16/24573* (2019.01); *G06F 16/313* (2019.01); *G06F 16/335* (2019.01); *H04L 67/306* (2013.01)

(58) Field of Classification Search
CPC .......... G06F 17/241; G06F 17/30525; G06F 17/30616; G06F 17/30699; H04L 67/306
(Continued)

(56) References Cited

U.S. PATENT DOCUMENTS 6,594,664 B1 * 7/2003 Estrada ............... G06F 16/954
8,032,471 B2 10/2011 Yahia
(Continued)

OTHER PUBLICATIONS

Stackoverflow, "What is reputation? How do I earn (and lose) it?", <http://stackoverflow.com/help/whats-reputation>; published Jun. 9, 2013.*
(Continued)

*Primary Examiner* — Stephen S Hong
*Assistant Examiner* — Broderick C Anderson
(74) *Attorney, Agent, or Firm* — Eversheds Sutherland (US) LLP

(57) ABSTRACT

A metadata item may be generated that includes metadata content corresponding to a selected portion of digital content stored on a first device, the metadata item may be associated with a first user profile, and the metadata item may be distributed to a second user device storing the digital content such that the metadata item can be accessed via a second user profile and rendered on the second user device in association with the digital content. In this manner, metadata content corresponding to digital content may be shared across user profiles that access the digital content. In addition, a collaborative content item may be generated that includes collaborative content associated with a word or phrase in digital content and that is editable by multiple user profiles.

20 Claims, 18 Drawing Sheets

(51) Int. Cl.
*G06F 16/31* (2019.01)
*G06F 16/335* (2019.01)
*G06F 16/2457* (2019.01)

(58) Field of Classification Search
USPC ........................................................ 715/230
See application file for complete search history.

(56) References Cited

U.S. PATENT DOCUMENTS

| | | | |
|---|---|---|---|
| 8,364,685 B2 | 1/2013 | Yahia | |
| 8,954,447 B1 | 2/2015 | Chatterjee | |
| 9,116,654 B1 | 8/2015 | Shah | |
| 9,495,637 B2 | 11/2016 | Yahia | |
| 2004/0133560 A1* | 7/2004 | Simske | G06F 16/313 |
| 2004/0205542 A1* | 10/2004 | Bargeron | G06F 17/241 |
| | | | 715/201 |
| 2008/0154908 A1* | 6/2008 | Datar | G11B 27/11 |
| 2009/0070376 A1* | 3/2009 | Eom | G06F 17/211 |
| 2009/0164402 A1 | 6/2009 | Yahia | |
| 2009/0171932 A1 | 7/2009 | Yahia | |
| 2009/0254802 A1* | 10/2009 | Campagna | G06F 17/217 |
| | | | 715/209 |
| 2010/0318893 A1* | 12/2010 | Matthews | G06F 17/241 |
| | | | 715/230 |
| 2011/0282823 A1 | 11/2011 | Yahia | |
| 2012/0173659 A1* | 7/2012 | Thaxter | G06F 15/0291 |
| | | | 709/217 |
| 2013/0117655 A1* | 5/2013 | Bennett | G06F 17/241 |
| | | | 715/229 |
| 2013/0138644 A1 | 5/2013 | Yahia | |
| 2013/0185657 A1 | 7/2013 | Gunawardena | |
| 2013/0239020 A1* | 9/2013 | Heo | G06Q 10/10 |
| | | | 715/753 |
| 2013/0339443 A1* | 12/2013 | Goldman | H04L 65/403 |
| | | | 709/204 |
| 2014/0331125 A1* | 11/2014 | Tigchelaar | G06F 17/211 |
| | | | 715/249 |
| 2015/0363405 A1 | 12/2015 | Biswas | |
| 2017/0140219 A1 | 5/2017 | King | |
| 2017/0169020 A9 | 6/2017 | Yahia | |

OTHER PUBLICATIONS

Stackoverflow, "Edit questions and answers", <http://stackoverflow.com/privileges/edit>; Published May, 31, 2013.*

"How to Link Keywords to URLs Automatically"; Karol; Themefuse; Jul. 27, 2014; <http://themefuse.com/wordpress-tutorial-how-to-link-keywords-to-urls-automatically/>.*

"Kindle Highlights Social Learning"; Marcia Connner; < http://marciaconner.com/blog/kindle-highlights>; Jul. 26, 2012.*

"Highlighting Multiple Words in a PDF Document"; Rick Borstein; <http://blogs.adobe.com/acrolaw/2007/12/highlighting_multiple_words_in_a/>; Nov. 20, 2010.*

O'Hear, Steve. "Sources: Dropbox Acqui-Hiring Social Reading App Readmill for $8 Million," posted Mar. 27, 2014; TechCrunch. Accessed Jan. 20, 2016 at http://techcrunch.com/2014/03/27/readmill-acqui-hired/ (2 pages.).

Dillet, Romain. "Glose is a New Ebook Reader That Turns Reading Into a Social Experience," posted Nov. 13, 2014; TechCrunch. Accessed Jan. 20, 2016 at http://techcrunch.com/2014/11/13/glose-is-a-new-ebook-reader-to-turn-reading-into-a-social-experience/ (4 pages.).

* cited by examiner

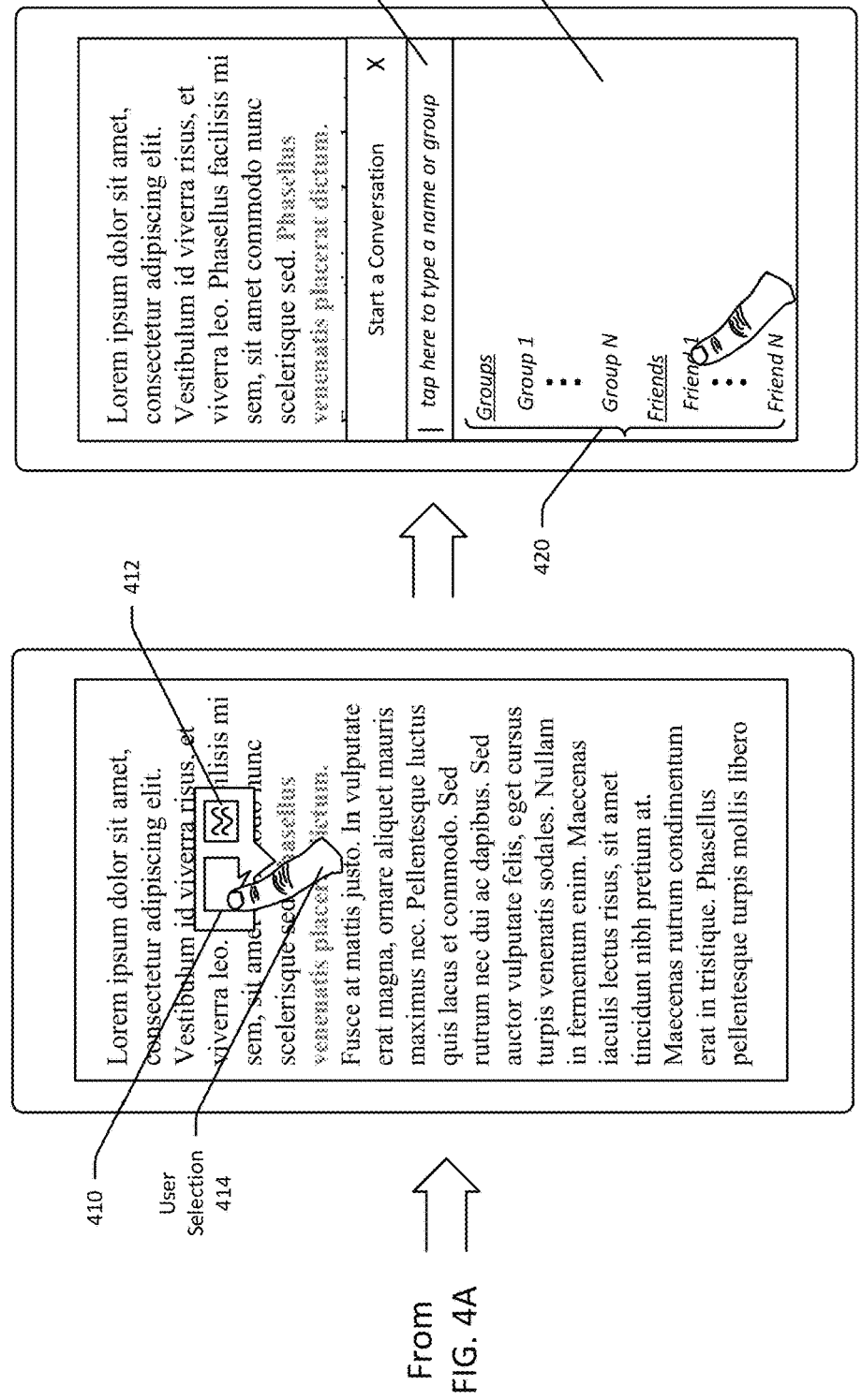

GENERATION AND DISTRIBUTION OF COLLABORATIVE CONTENT ASSOCIATED WITH DIGITAL CONTENT

BACKGROUND

Users may utilize a variety of types of electronic devices such as an electronic reader device ("e-reader"), a tablet device, a smartphone, or the like to consume digital content such as text content, graphical content, audio content, video content, and so forth. Applications executing on a user device may provide a user with the capability to interact in various ways with digital content rendered on the user device. For example, an e-reader application executing on an e-reader, tablet, or smartphone may provide a user with a capability to annotate or highlight content in an electronic book ("e-book"), bookmark content at a particular location in the e-book, and so forth.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIGS. 4A-4D are schematic diagrams illustrating the receipt of message content from a first user profile associated with a first user device, the association of the message content with a portion of digital content specified by the first user profile, the receipt of input from the first user profile identifying a second user profile, and the delivery of the message content to a second user device for presentation to the second user profile in association with the portion of the digital content in accordance with one or more example embodiments of the disclosure.

DETAILED DESCRIPTION

Overview

Figure 1:
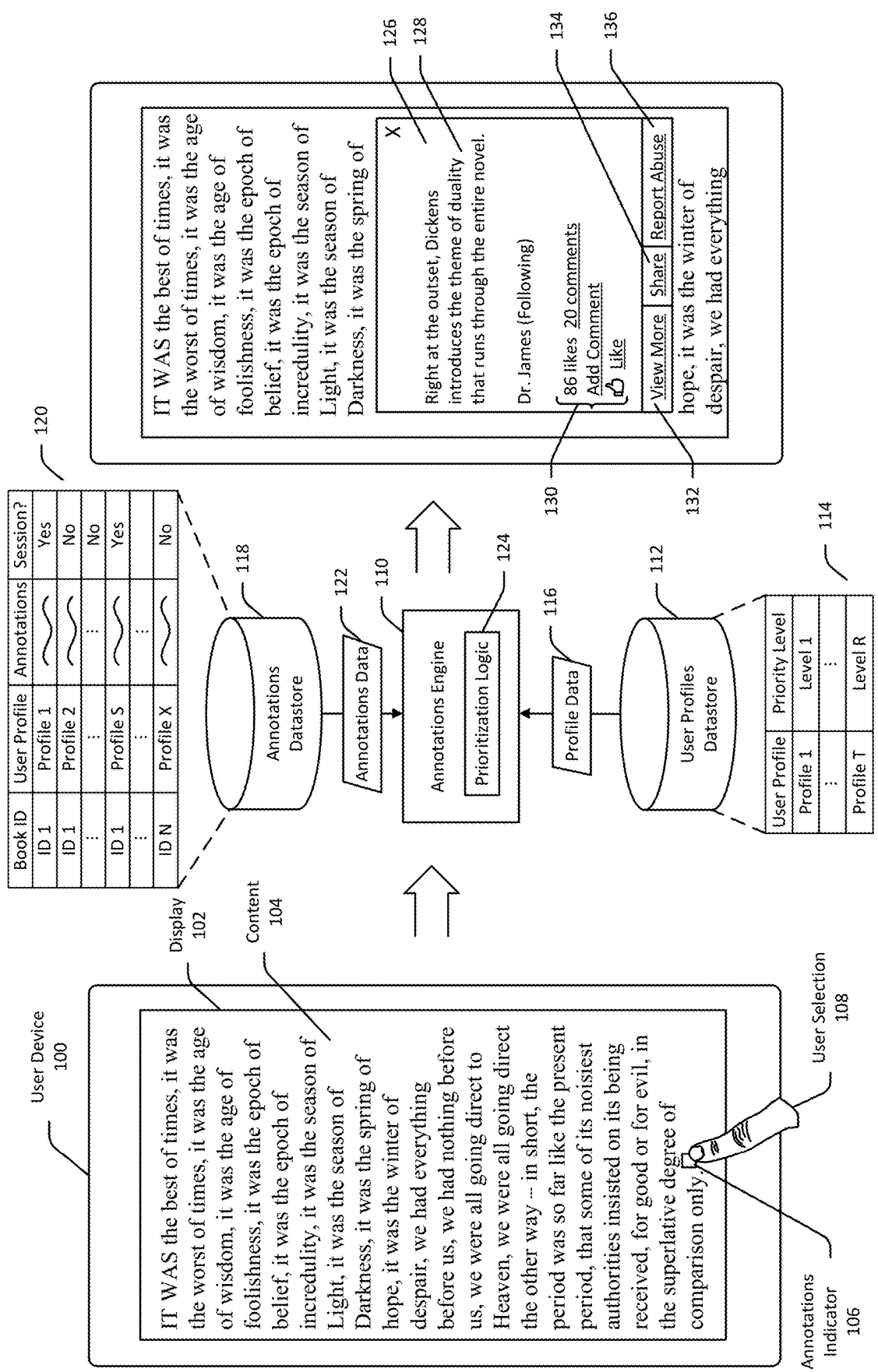
FIG. 1 is a schematic diagram illustrating a rendering, on a display of a user device, of digital content stored in association with a first user profile, selection of an annotation associated with a second user profile, and a rendering of the annotation inline with the digital content in accordance with one or more example embodiments of the disclosure.

This disclosure relates to, among other things, devices, systems, methods, computer-readable media, techniques, and methodologies for enabling the generation of a metadata item that includes metadata content corresponding to a selected portion of digital content stored on a first device, association of the metadata item with a first user profile, and distribution of the metadata item to a second user device storing the digital content such that the metadata item can be accessed via a second user profile and rendered on the second user device in association with the digital content. In this manner, metadata content corresponding to digital content may be shared across user profiles that access the digital content.

In example embodiments of the disclosure, a copy of a digital content file may be stored on a user device. The digital content file may be formatted in accordance with any suitable format. In certain example embodiments, the digital content file is not editable on the user device. More specifically, in certain example embodiments, the digital content file is a read-only file that a user profile consuming the digital content does not have privileges to edit, but with which annotations and/or collaborative content that is editable by multiple user profiles may be associated. As a non-limiting example, the digital content file may be an e-book formatted in accordance with an e-book file format. An identifier of the digital content file and an identifier (e.g., a Media Access Control (MAC) address) of a network interface of the user device storing the digital content file may be stored on a remote server in association with an identifier of a user profile. In other example embodiments, the digital content file may be stored on a remote server and streamed to a user device. For example, in such other example embodiments, an identifier of the digital content file may be stored in association with a particular user profile on the remote server, and a user device may be logged into the particular user profile to enable streaming of the digital content file.

The metadata content may be, for example, an annotation corresponding to the selected portion of the digital content, a highlight of the selected portion of the digital content, or the like. The metadata content may include text content, graphical content, audio content, video content, or the like. The metadata content may be contained within a metadata item (e.g., a metadata object). In certain example embodiments, the metadata item may include additional metadata associated with the metadata content. This additional metadata may be associated with one or more user profiles other than the user profile with which the metadata content is associated and may indicate or include, for example, user sentiment towards the metadata content, commentary on the metadata content, or the like.

The metadata item may further include anchor data in addition to the metadata content. The anchor data may indicate a set of position identifiers associated with the selected portion of the digital content to which the metadata content corresponds. For example, the set of position identifiers may include a start position identifier of an initial character of the selected portion of the digital content and an end position identifier of a final character of the selected portion of the digital content. In other example embodiments, the anchor data may include a position identifier corresponding to each character or discrete renderable element in the selected portion of the digital content.

In certain example embodiments, a user device may store a database file for each digital content file stored on the user device. Each database file may include a set of data elements corresponding to various data fields. Each database file may be packaged in a container and sent to the user device from a remote server as part of a download of the corresponding digital content file from the remote server. In certain example embodiments, each database file may include a respective user profile identifier corresponding to each user profile that generated metadata content corresponding to at least a portion of content in the digital content file with which the database file is associated. While a metadata item may be described herein at times as being generated by a user profile, it should be understood that the metadata item may be system-generated from content specified by a user associated with the user profile and may be subsequently associated with the user profile to indicate that the user associated with the user profile is the originating source of the content.

The database file may further include, for each user profile identifier, the corresponding metadata items that include metadata content generated by the user profile identified by the user profile identifier. In certain example embodiments, the database file for each digital content file may be consolidated into a single annotations database (or a single annotations database file) in which the data from each database file is stored in association with an identifier of the corresponding digital content file. If an additional metadata item corresponding to a digital content file is generated, a remote server may send a notification to the user device. The notification may include the metadata item, or more specifically, the metadata content, anchor data, and optionally, any additional metadata associated with the metadata content. The notification may further include the user profile identifier for the user profile that generated the metadata content and the identifier of the digital content file to which the metadata item relates. The user device may then store the metadata item in the annotations database in association with the identifier of the digital content file.

As previously noted, a user device may be associated with a particular user profile. The association may be a non-transient association according to which a device identifier for the user device is stored in association with a user profile identifier for the user profile, perhaps on a remote server. In a non-transient association, the user device may remain associated with the user profile unless the device identifier is actively disassociated from the user profile identifier, perhaps in response to a user request. In other example embodiments, the association between the user device and the particular user profile may be a transient association according to which a user may utilize the user device to log into a user profile, and the user device may remain associated with the user profile only as long as the user device is logged into the user profile.

In certain example embodiments, a user device may also include a user profile database (or database file) that includes a corresponding user profile identifier for each user profile that is associated with a user profile that is linked to or otherwise associated with the user device. Various types of associations may exist between user profiles. For example, a first user profile and a second user profile may be associated with one another in accordance with a bi-directional association. A bi-directional association may be established if, for example, a first user associated with the first user profile authorizes the association with the second user profile and a second user associated with the second user profile authorizes the association with the first user profile. An example of a bi-directional association between user profiles may be a "friend" relationship in the social networking context. As another example, a first user profile and a second user profile may be associated with one another in accordance with a unidirectional association. A unidirectional association may only require at least one of the first user or the second user to authorize the association between their corresponding user profiles. An example of a unidirectional association may be the "follower" relationship in the social networking context.

In certain example embodiments, a unidirectional association may be automatically established between user profiles. For example, each user profile associated with a corresponding user device storing a particular digital content file may be, upon download of the digital content file to the user device, automatically unidirectionally associated with a user profile associated with a user (e.g., an author) or other entity that created the digital content. Further, in certain example embodiments, existing social networking relationships may be leveraged to establish associations between user profiles. For example, if two social networking profiles are associated via a bi-directional or unidirectional association, corresponding digital content consumption user profiles may be similarly associated without requiring explicit user authorization. In addition, in certain example embodiments, a user profile that has generated a threshold amount of metadata content for particular digital content or metadata content determined to be of a threshold quality may be recommended for association with other user profiles associated with user devices storing the digital content.

In certain example embodiments, digital content included in a digital content file stored on a user device may be rendered on a display of the device. A metadata item indicator may also be rendered in association with the digital content. The metadata item indicator may be a graphical indicator rendered at a particular location on the display so as to indicate that metadata content has been generated for at least a portion of the digital content. It should be understood that a portion may refer to a whole or only a fractional part thereof. For example, the metadata item indicator may be rendered after a sequence of characters representing a word or phrase for which metadata content has been generated. In certain example embodiments, the sequence of characters may be displayed more conspicuously than surrounding characters (e.g., bolded, italicized, highlighted, shaded, rendered in a different font type or size, etc.) to indicate which portion of the digital content the metadata item indicator references. For given digital content rendered on the display, multiple metadata item indicators may be rendered along with the digital content, with each indicator corresponding to a particular portion of the digital content. In certain example embodiments, a digital content consumption application (e.g., an e-reader application) executing on the user device may provide functionality for activating or deactivating the display of metadata item indicators.

In response to a user selection of a particular metadata item indicator, an annotations engine executing on the user device may determine the portion of the digital content associated with the metadata item indicator. The annotations engine may include hardware, software, and/or firmware components of the user device. For example, the annotations engine may determine a set of position identifiers including a start position corresponding to an initial character of the portion of the digital content and an end position corresponding to a final character of the portion of the digital content. In certain example embodiments, such as those in which position identifiers are non-sequential, the set of position identifiers may include a position identifier for each character in the portion of the digital content. The annotations engine may then access the annotations database to retrieve a set of one or more user profile identifiers, where each user profile identifier identifies a corresponding user profile associated with at least one metadata item corresponding to the portion of the digital content. More specifically, the annotations engine may analyze the anchor data stored in each metadata item to determine which metadata item(s) include anchor data that matches the set of position identifiers. In other example embodiments, each metadata item indicator may be linked to one or more user profile identifiers that identify user profile(s) that are associated with metadata item(s) generated for the portion of the digital content associated with the metadata item indicator.

The annotations engine may then select metadata content included in a particular metadata item associated with a particular user profile having a user profile identifier included in the set of user profile identifier(s) retrieved from the annotations database. More particularly, the annotations engine may retrieve a set of user profile identifiers from the user profile database and determine a particular user profile identifier included in both the set of user profile identifiers retrieved from the annotations database and the set of user profile identifiers retrieved from the user profile database. The selected metadata content may be rendered on the display of the user device in association with the digital content. In certain example embodiments, the metadata content may be rendered inline with the digital content. For example, the digital content may be reflowed such that a first part of the digital content is rendered above the metadata content and a second part of the digital content is rendered below the metadata content. In those example embodiments in which the metadata content pertains to only a portion of the digital content initially rendered on the display, the metadata content may be rendered entirely above or below the portion of the digital content but nonetheless between a first part and a second part of the digital content. Along with the rendering of the metadata content, the portion of the digital content associated with the metadata content may be conspicuously displayed in relation to the remaining digital content that is rendered.

In certain example embodiments, metadata items associated with different user profiles may be associated with the portion of the digital content. For example, for digital content rendered on a display of a user device associated with a first user profile, the user profile database stored on the user device may include a second user profile and a third user profile associated with the first user profile. The annotations database may include a first metadata item associated with the second user profile and a second metadata item associated with the third user profile. Each of the first metadata item and the second metadata item may correspond to a same (or at least an overlapping) portion of the digital content. In such example embodiments, the annotations engine may execute prioritization logic to determine which metadata item to select for rendering of corresponding metadata content inline with a rendering of the digital content. For example, a priority designation may be stored in association with each user profile identifier in the user profile database. Each priority designation may indicate a priority level for metadata content generated by a user profile associated with the corresponding user profile identifier. The annotations engine may determine which of the second user profile identifier and third user profile identifier is associated with a priority designation indicating a higher priority level and may render corresponding metadata content inline with the digital content.

In certain example embodiments, a particular user profile may be associated with a default highest priority level. For example, a user profile associated with a content creator may be assigned a default highest priority level such that metadata content generated by the content creator is always displayed inline with corresponding digital content for all user profiles accessing the digital content. In other example embodiments, a priority level associated with a user profile may be determined based on various parameters such as, for example, an amount of metadata content (e.g., a number of metadata items) generated by the user profile for a particular digital content file (e.g., a particular e-book), an amount of additional metadata generated by other user profiles and associated with metadata content generated by the user profile, a level of positive user sentiment expressed in such additional metadata, and so forth. Further, in certain example embodiments, a priority level associated with a user profile may be determined based on a type of association between the user profile that generated the metadata content and the user profile accessing the digital content. For example, for a first user profile accessing digital content, a second user profile associated via a bidirectional association with the first user profile may be assigned a higher priority level with respect to the first user profile than a third user profile associated via a unidirectional association with the first user profile. As such, metadata content generated by the second user profile and associated with a portion of the digital content may be prioritized for display over metadata content generated by the third user profile and associated with the portion of the digital content. More specifically, the metadata content generated by the second user profile may be rendered inline with the portion of the digital content rendered on a user device via which the first user profile accesses the digital content based on the higher priority level associated with the second user profile.

In certain example embodiments, a user interface panel that displays metadata content from multiple metadata items may be accessed on a user device. The user interface panel may be scrollable to cause further metadata content to be displayed. A location indicator may be displayed in the user interface panel that may provide an indication (e.g., a graphical indication) of a respective location in the digital content to which each metadata content item (e.g., each annotation) corresponds.

In certain example embodiments, a metadata item may be generated on a user device. For example, a user associated with a user profile for consuming digital content on the user device may provide user input to the device indicative of a selection of a portion of the digital content. The selected portion of the digital content may be a portion of the content currently being rendered on a display of the device. As another example, the user may select a portion of the digital content not currently being rendered on the device (e.g., select a particular location of an e-book). The user may then provide metadata content relating to the selected portion of the digital content. The metadata content may include, for example, text inputted by the user that constitutes an annotation of the selected portion of the digital content. In certain example embodiments, the metadata content may include multimedia content such as audio content, video content, graphical content, interactive content, or the like.

The annotations engine (or another component executable on the user device) may receive the identification of the selected portion of the digital content and the metadata content and may generate a metadata item that includes the metadata content. In addition, the annotations engine may generate anchor data that includes a set of position identifiers corresponding to the selected portion of the digital content. The anchor data may be included in the metadata item. The annotations engine may associate the metadata item with a user profile via which the digital content is accessed on the user device (e.g., a user profile associated with a user that supplied the metadata content). As an example, the metadata item may be an annotation data object that includes a user-specified annotation and anchor data indicative of the portion of the digital content to which the annotation relates.

Upon generation, metadata items may be archived or otherwise stored on the user device. A delivery engine, which may include hardware, software, and/or firmware components of the user device, may send one or more metadata items to one or more distribution servers upon the occurrence of a triggering event. The triggering event may be, for example, a threshold period of time elapsing since a metadata item was generated, a threshold number of metadata items having been generated and associated with a user profile, a threshold number of metadata items having been generated for a particular portion of the digital content, a threshold number of other user profiles associated with the user profile, and so forth.

Upon receiving a metadata item, a distribution server may determine which user profiles the metadata item should be distributed to. More specifically, a distribution analysis engine executing on the distribution server may identify a set of one or more user profiles, where each user profile in the set is associated with the user profile that generated the metadata item. The distribution analysis engine may include hardware, software, and/or firmware components of the distribution server. Upon identifying the set of user profile(s) associated with the user profile that generated the metadata item, the distribution analysis engine may determine a corresponding user device associated with each user profile. The distribution analysis engine may then direct a notifications engine to send the metadata item to each user device associated with each user profile determined to be associated with the user profile that generated the metadata item. Prior to directing the notifications engine to send the metadata item to a user device, the distribution server may apply one or more content filters to the metadata content of the metadata item. In certain example embodiments, content that does not satisfy requirements of a content filter may be excluded from the metadata content or modified to satisfy requirements of the content filter, while in other example embodiments, if any portion of the metadata content fails to satisfy the requirements of a content filter, the entire metadata content may be rejected, and the notifications engine may send a notification to the user device from which the metadata item was received indicating that the metadata content was rejected.

More specifically, as previously described, a device identifier (e.g., a MAC address) of a user device may be stored in association with a corresponding user profile via which digital content is consumed on the user device. When a user device connects to a network, an application executing on the user device (e.g., a web browser, an e-reader application, etc.) may send a message to the distribution server. In certain example embodiments, the message may be a request for new metadata items that have been generated since a most recently received metadata item, but need not be. For example, the message may simply be ping message, test message, or the like. The message may indicate an Internet Protocol (IP) address associated with the user device and a MAC address of a network interface of the user device. The distribution server may store the IP address in association with the MAC address. When the distribution analysis engine determines that a metadata item is to be made available to a particular user profile, the distribution analysis engine (or the notifications engine) may identify the MAC address of the user device corresponding to the user profile and the IP address stored in association with the MAC address. The notifications engine may utilize the IP address to push the metadata item to the user device. In other example embodiments, after a user device connects to a network, an application executing on the user device may pull metadata item(s) from the distribution server.

In certain example embodiments, the notifications engine may send a notification of a metadata item generated by a first user profile to a second user profile not currently associated with the first user profile. For example, the distribution analysis engine may determine that the first user profile has a priority level with respect to particular digital content (e.g., a particular e-book) that exceeds a threshold level and may instruct the notifications engine to send a notification to the second user profile recommending that the second user profile establish an association with the first user profile to make metadata content generated by the first user profile available to the second user profile. For example, the first user profile may be associated with a content creator such as an author of an e-book, and thus, may have a priority level that indicates that the first user profile should be recommended for association with each user profile that accesses and consumes a copy of the e-book. Upon becoming associated with the first user profile, metadata content generated by the first user profile may be accessible by the associated user profile in connection with consumption of the e-book content. As another example, a user profile may attain a priority level that causes the user profile to be recommended for association to other user profiles if, for example, the user profile has generated a threshold amount of metadata content for particular digital content or digital content generally, the user profile is associated with a threshold number of other user profiles, and so forth.

In certain example embodiments, a first user associated with a first user profile may provide user input to a first user device indicative of a selection of a portion of digital content rendered on the first user device. As previously noted, the first user may provide metadata content (e.g., an annotation) for association with the selected portion of the digital content. In other example embodiments, the first user may provide message content for association with the selected portion of the digital content. More specifically, after the portion of the digital content is selected, a graphical indicator may be displayed. Selection of the graphical indicator may initiate a process for specifying message content and selecting recipient(s) of the message content. The message content may include textual content, audio content, video content, and so forth. The message content and anchor data including, for example, a set of position identifiers representation of the selected portion of the digital content to which the message content relates may then be delivered to a respective user device associated with each recipient user profile. For example, the message content may be presented inline with the portion of the digital content rendered on a second user device associated with a second user profile.

In certain example embodiments, the message content may be presented within a user interface (UI) object that provides a capability for the recipient user profile(s) to engage in an information exchange session (e.g., a chat session) with each other and with the first user profile that generated the message content. For example, the UI object may be selectable, and responsive to selection, an expanded representation of the UI object may be presented. A user associated with a recipient user profile may provide additional message content via the expanded representation of the UI object, and the additional message content may be associated with the message content specified by the first user profile. In a similar manner, any participant in the information exchange session (e.g., any recipient user profile) may provide additional message content via the expanded UI object for association with the information exchange session.

This disclosure also relates to, among other things, devices, systems, methods, computer-readable media, techniques, and methodologies for generating a collaborative content item that includes collaborative content associated with digital content (e.g., a portion of e-book content such as a word or phrase in the e-book). The word or phrase may include a person, place, thing, date, concept, quote, or the like that appears in the digital content. The collaborative content of the collaborative content item may be editable by any number of user profiles having access to the digital content. In certain example embodiments, digital content may be processed to identify various words or phrases in the digital content that are candidates for generation of corresponding collaborative content items. For example, a word or phrase may be determined to be a candidate for a collaborative content item if the word or phrase appears more than a threshold number of times in digital content. As another example, a word or phrase may be determined to be a candidate for a collaborative content item if the word or phrase appears in more than a threshold number of third-party content sources referencing the digital content. As yet another example, a word or phrase may be determined to be a candidate for a collaborative content item if the word or phrase is associated with a threshold amount of other metadata content (e.g., a threshold number of annotations). It should be appreciated that the above examples are merely illustrative and not exhaustive.

In certain example embodiments, a collaborative content item indicator may be rendered in association with a rendering of digital content. More specifically, a collaborative content item indicator may be rendered in association with a word or phrase for which a collaborative content item exists. Selection of the collaborative content item indicator may cause the content of the collaborative content item to be rendered. The collaborative content may be editable by each user profile having access to the digital content with which the collaborative content item is associated. In certain example embodiments, a first type of collaborative content item indicator may indicate that a collaborative content item has been generated for a word or phrase in the digital content and a second type of collaborative content item indicator may indicate that no collaborative content item currently exists for a word or phrase but that the word or phrase is a candidate word or phrase for which a collaborative content item may be generated.

A user may provide user input representative of content for a new collaborative content item or edited content for an existing collaborative content item. Prior to incorporating the edited content into an existing collaborative content item or generating a new collaborative content item with new content, the user-specified content may be associated with a user profile of the user and sent from the user device that receives the content to one or more content curation servers to determine whether the content is acceptable for inclusion in a collaborative content item for the associated word or phrase to which the content relates.

A content curation server may receive content from a user device and may determine the user profile that generated the content. The content curation server may further determine a content quality score associated with the user profile. The content quality score may be indicative of an amount and/or quality of previous collaborative content generated by the user profile. The content quality score may be determined based on one or more content quality parameters that may include, for example, a number of additional collaborative content items, each of which includes at least a portion of the collaborative content previously generated by the user profile, a number of edits made to the collaborative content previously generated by the user profile, a number of times the previously generated collaborative content was consumed (e.g., accessed and scrolled through), and so forth. Each content quality parameter may be assigned a weight indicative of its relative impact on the content quality score and the weighted content quality parameters may be used to generate the content quality score for the user profile.

The content quality score may then be compared to a threshold value. If the content quality score exceeds the threshold value, the content generated by the user profile may be determined to be of sufficient quality and the content and an indication of the word or phrase to which the content relates (or an indication (e.g., an identifier) of an existing collaborative content item for the word or phrase) to one or more user devices such as, for example, each user device storing the digital content. If, on the other hand, the content quality score does not exceed the threshold value, a content curation process may be performed on the content. In certain example embodiments, a content quality score may also be generated for the content itself. If the content quality score for the content exceeds a second threshold value, in addition to or as an alternative to the content quality score for the user profile exceeding the first threshold value, the content may be sent to one or more user devices storing the digital content. On the other hand, if the content quality score for the content does not exceed the second threshold value, the content curation process may be performed on the content.

In certain example embodiments, a user may manually curate the content, while in other example embodiments, an automated script or algorithm may be executed to curate the content. After curation, the content curation server may determine whether the curated content is acceptable for inclusion in a collaborative content item for the associated word or phrase. This determination may be based on a manual assessment by a user or an automated output generated as a result of execution of the automated script or algorithm. If the curated content is deemed acceptable, the curated content and an indication of the word or phrase or an indication of an existing collaborative content item for the phrase or word may be sent to one or more user devices storing the digital content. If the curated content is not deemed acceptable, it may be rejected and a notification that the content has been rejected may be sent to the user device from which the content was received.

Example embodiments of the disclosure provide a number of technical features or technical effects. For example, in accordance with example embodiments of the disclosure, metadata content (e.g., an annotation of digital content) provided by a first user associated with a first user profile may be made available to a second user associated with a second user profile based on an association between the first user profile and the second user profile and may be accessed by the second user during consumption of the digital content. Further, the metadata content that is selected for display and the manner in which it is displayed may be determined based on the nature of the association between the first user profile and the second user profile. In addition, collaborative content associated with a word or phrase in digital content may be generated by a first user associated with a first user profile and may be editable by one or more additional users associated with one or more additional user profiles. The collaborative content may subjected to a content curation process depending on whether a content quality score associated with the user profile of the user that generated the collaborative content and/or a content quality score associated with the collaborative content itself exceed respective threshold values. It should be appreciated that the above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Use Cases, User Interfaces, and Processes

Figure 8:
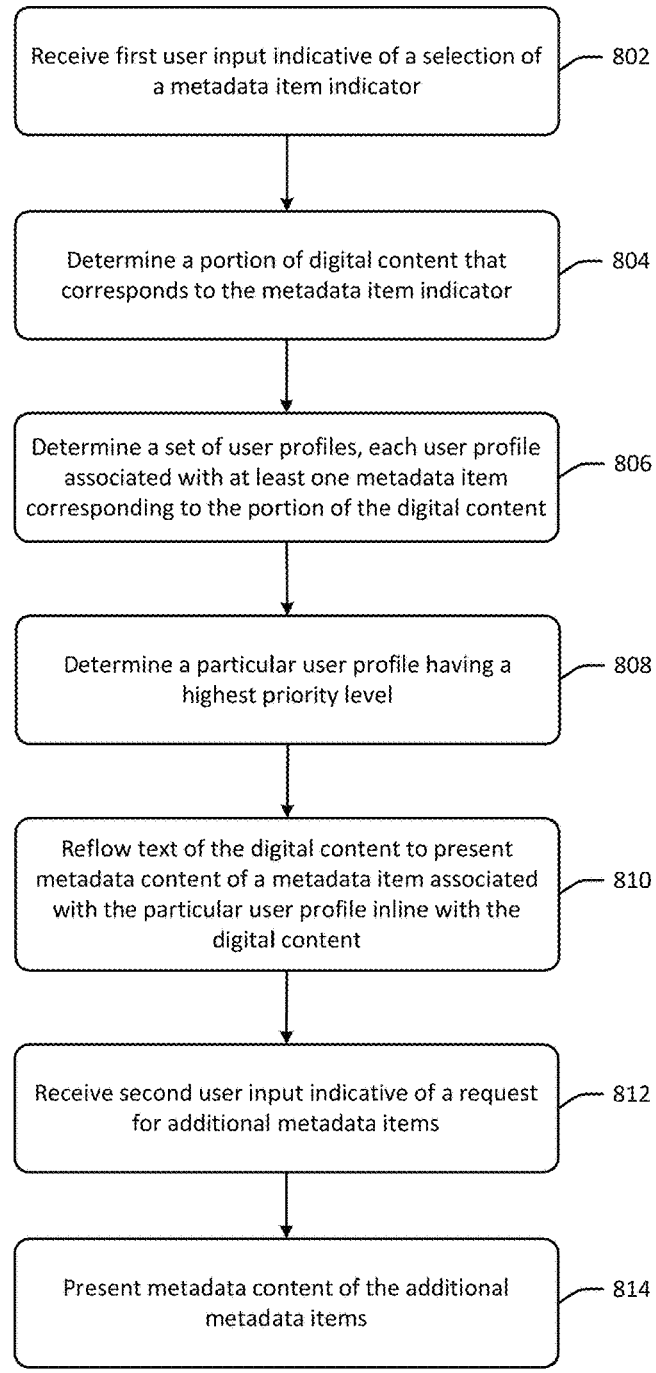
FIG. 8 is a process flow diagram of an illustrative method for receiving a selection of a metadata item indicator rendered on a display of a user device in association with digital content that is stored in association with a first user profile, selecting a metadata item associated with a second user profile, and rendering content of the metadata item inline with the digital content on the display of the user device in accordance with one or more example embodiments of the disclosure.

FIG. 1 is a schematic diagram illustrating a rendering, on a display of a user device, of digital content stored in association with a first user profile, selection of an annotation associated with a second user profile, and a rendering of the annotation inline with the digital content in accordance with one or more example embodiments of the disclosure. FIG. 8 is a process flow diagram of an illustrative method 800 for receiving a selection of a metadata item indicator rendered on a display of a user device in association with digital content that is stored in association with a first user profile, selecting a metadata item associated with a second user profile, and rendering content of the metadata item inline with the digital content on the display of the user device in accordance with one or more example embodiments of the disclosure. FIGS. 1 and 8 will be described in conjunction with one another hereinafter. While the operations of FIG. 8 may be described in the context of annotations of digital content, it should be appreciated that the operations of FIG. 8 are applicable to any metadata item including metadata content corresponding to digital content.

A illustrative user device 100 including a display 102 is depicted in FIG. 1. The user device 100 may be any suitable device including, but not limited to, an e-reader, a smartphone, a tablet, a wearable computing device, a personal digital assistant, a laptop computer, or the like. The display 102 may include any suitable display including, but not limited to, a reflective display, a transmissive display, a transflective display, or the like. Digital content 104 is illustratively shown as being rendered on the display 102. The digital content 104 may be, for example, a screen image including text of an e-book. While example embodiments may be described and depicted herein in the context of text-based content of an e-book, it should be appreciated that such embodiments are applicable to any of a variety of types of digital content.

An annotations indicator 106 is depicted as being rendered in association with the content 104. The annotations indicator 106 may be, for example, a graphical indicator that indicates that one or more annotations are associated with at least a portion of the content 104. In certain example embodiments, the annotations indicator 106 may indicate that annotation(s) are available for the entire rendered content that precedes the indicator 106. Although not shown in FIG. 1, in other example embodiments, the portion of the content 104 to which the annotations indicator 106 corresponds may be displayed more conspicuously than surrounding text. In still other example embodiments, a user-selectable user interface element (e.g., a button) may be provided that responsive to selection may cause display of annotation indicators to be activated or deactivated.

Referring now to FIG. 8 in conjunction with FIG. 1, at block 802, the user device 100 may receive first user input indicative of a selection of the annotations indicator 106. Selection of the annotations indicator 106 may cause an annotations engine 110 to determine a portion of the content 104 that corresponds to the annotations indicator 106. For example, the annotations engine 110 may determine a set of position identifiers including a start position corresponding to an initial character of the portion of the content 104 and an end position corresponding to a final character of the portion of the content 104. In certain example embodiments, such as those in which position identifiers are non-sequential, the set of position identifiers may include a position identifier for each character in the portion of the content 104.

At block 806, the annotations engine 110 may determine a set of user profiles, where each user profile is associated with at least one annotation data object corresponding to the portion of the content 104. As previously noted, an annotations data object may be a type of metadata item and may include an annotation corresponding to a portion of digital content as well as anchor data that indicates a location of the content portion within the digital content. More specifically, at block 806, the annotations engine 110 may access an annotations datastore 118 to retrieve annotations data 122 including a set of one or more user profile identifiers stored in a database file 120, where each user profile identifier in the set identifies a corresponding user profile associated with at least one annotation data object corresponding to the portion of the content 104. The set of one or more user profile identifiers may include some subset of the user profile identifiers stored in the database file 120 in association with an identifier of the e-book (e.g., ID 1). The annotations data 122 may further include the annotation data object(s) associated with each user profile having a user profile identifier in the retrieved set of user profile identifiers.

More specifically, the annotations engine 110 may analyze anchor data stored in each annotation data object to determine which annotation data objects include anchor data that matches the set of position identifiers. In other example embodiments, the annotations indicator 106 may be linked to one or more user profile identifiers that identify user profile(s) that are associated with annotation data objects corresponding to the portion of the content 104 associated with the annotations indicator 106.

At block 808, the annotations engine 110 may execute prioritization logic 124 to select a particular user profile having a user profile identifier in the set of user profile identifiers retrieved at block 806. The selected user profile may be a user profile having a highest priority level for display of annotations associated with the e-book than each other user profile having a user profile identifier in the set of user profile identifiers. In particular, the annotations engine 110 may retrieve profile data 116 from a user profiles datastore 112 that stores a database file 114 of user profile identifiers and corresponding priority designators. The profile data 116 may include a set of user profiles associated with the user profile accessing the content 104 as well as a corresponding priority designation associated with each user profile identifier that indicates a priority level for the corresponding user profile. The annotations engine 110 may compare the set of user profile identifiers included in the annotations data 122 to the set of user profile identifiers included in the profile data 116 to determine which user profile identifiers are present in both datasets. The user profile identifiers present in both datasets correspond to user profiles associated with the user profile accessing the content 104 and which are each associated with at least one annotation of at least a portion of the content 104. Upon determining the subset of user profile identifiers present in both the annotations data 122 and the profile data 116, the annotations engine 110 may determine a priority designator associated with each user profile identifier in the subset and may compare the priority designators to determine the user profile identifier associated with the priority designator indicative of the highest priority level. The user profile corresponding to the user profile identifier associated with the highest priority level may be the user profile identified at block 808.

In an example scenario associated with the operation at block 808, the profile data 116 may include a second user profile identifier of a second user profile and a third user profile identifier of a third user profile, where each of the second user profile and the third user profile is associated with a first user profile accessing the content 104. The annotations data 122 may include a first annotation data object associated with the second user profile and a second annotation data object associated with the third user profile. Each of first annotation data object and the second annotation data object may correspond to a same (or at least an overlapping) portion of the content 104. In such example an example scenario, the annotations engine 110 may execute prioritization logic 124 to determine which annotation data object to select for rendering of corresponding annotation content inline with a rendering of the content 104. For example, the annotations engine 110 may determine, from the profile data 116, which of the second user profile identifier and third user profile identifier is associated with a priority designation indicating a higher priority level and may render a corresponding annotation inline with the content 104.

At block 810, a rendering engine (not shown) may reflow the content 104 to present an annotation 128 contained in an annotation data object associated with the particular user profile determined at block 808. More specifically, a user interface object 126 may be presented that includes the annotation 128 and an indication of the user profile that generated the annotation. The user interface object 126 may also include an indication of the relationship between the user profile that generated the annotation and the user profile accessing the content 104 and the annotation 128. For example, an example unidirectional association (e.g., "following") is depicted in FIG. 1. The user interface object 126 may further include additional metadata 130 associated with the annotation 128. The additional metadata 130 may indicate user sentiment of other user profiles towards the annotation 128, may include commentary on the annotation 128, and so forth. Various user-selectable elements (e.g., buttons) may also be rendered as part of the user interface object 126. These may include a button 132 that responsive to user selection may cause additional annotations to be rendered on the display 102. The additional annotations may be generated by the same user profile that generated the annotation 128 shown as being rendered inline with the content 104 and/or may include annotations generated by one or more other user profiles. In addition, a button 134 may be provided that responsive to user selection may initiate a process for sharing the annotation data object with one or more other user profiles. For example, the user profile accessing the content 104 may share the annotation data object with one or more other user profiles with which the user profile is associated. In addition, a button 136 may be provided that responsive to user selection may initiate a process for reporting abuse. For example, if the annotation 128 or the additional metadata 130 associated with the annotation 128 includes abusive, derogatory, or otherwise inappropriate content, a user may select the button 136 which may cause a notification to be sent to a back-end server to perhaps initiate a curation of the annotation 128 and/or the additional metadata 130. In addition, the back-end server may send a notification to a user profile that generated the annotation 128 or the portion of the additional metadata 130 that was objected to. It should be appreciated that the user-selectable elements depicted as part of the user interface object 126 in FIG. 1 and their corresponding functions are merely illustrative and not exhaustive.

At block 812, the user device 100 may receive second user input indicative of a request for additional annotations. The second user input may correspond, for example, to a user selection of the button 132. At block 814, the annotations engine 110 may cause additional annotations forming part of additional annotation data objects to be presented on the display 102 of the user device 102.

In certain example embodiments, the annotations data 122 may further include data indicating which other user profiles are engaged in information exchange session(s) (e.g., chat session(s)) with the user profile accessing the content 104 on the user device 100. For example, the annotations data 122 may include, for each information exchange session, a corresponding session identifier that is stored in association with each user profile that is a participant in the information exchange session. The annotations data 122 may further include message content of the information exchange session. The message content may also be stored in association with the session identifier as part of the annotations data 122.

Figure 2A:
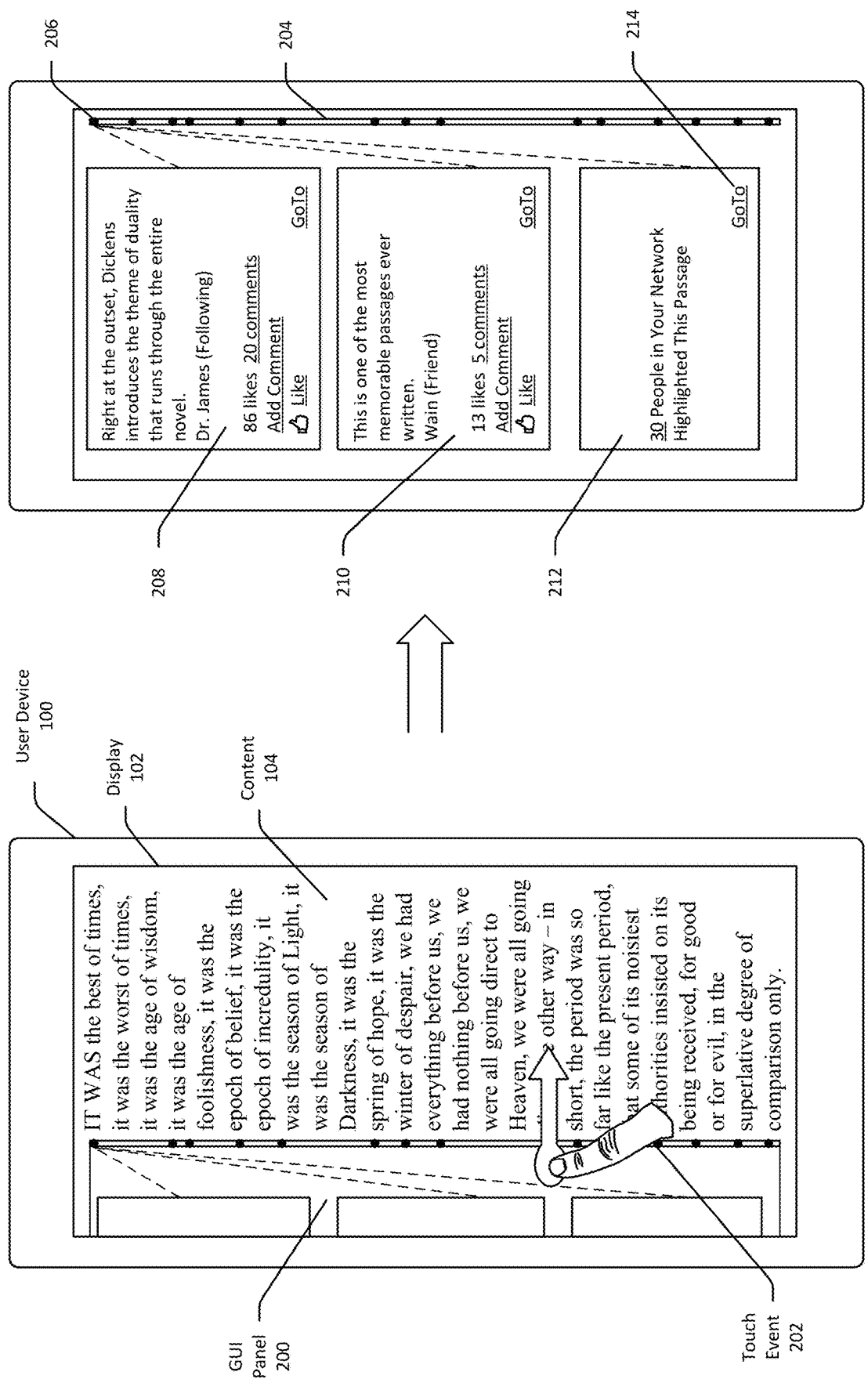
FIGS. 2A-2B are schematic diagrams illustrating i) example user interfaces that are rendered on a display of a user device associated with a first user profile and that display annotations associated with one or more other user profiles and ii) example user interactions with the example user interfaces in accordance with one or more example embodiments of the disclosure.
Figure 2B:
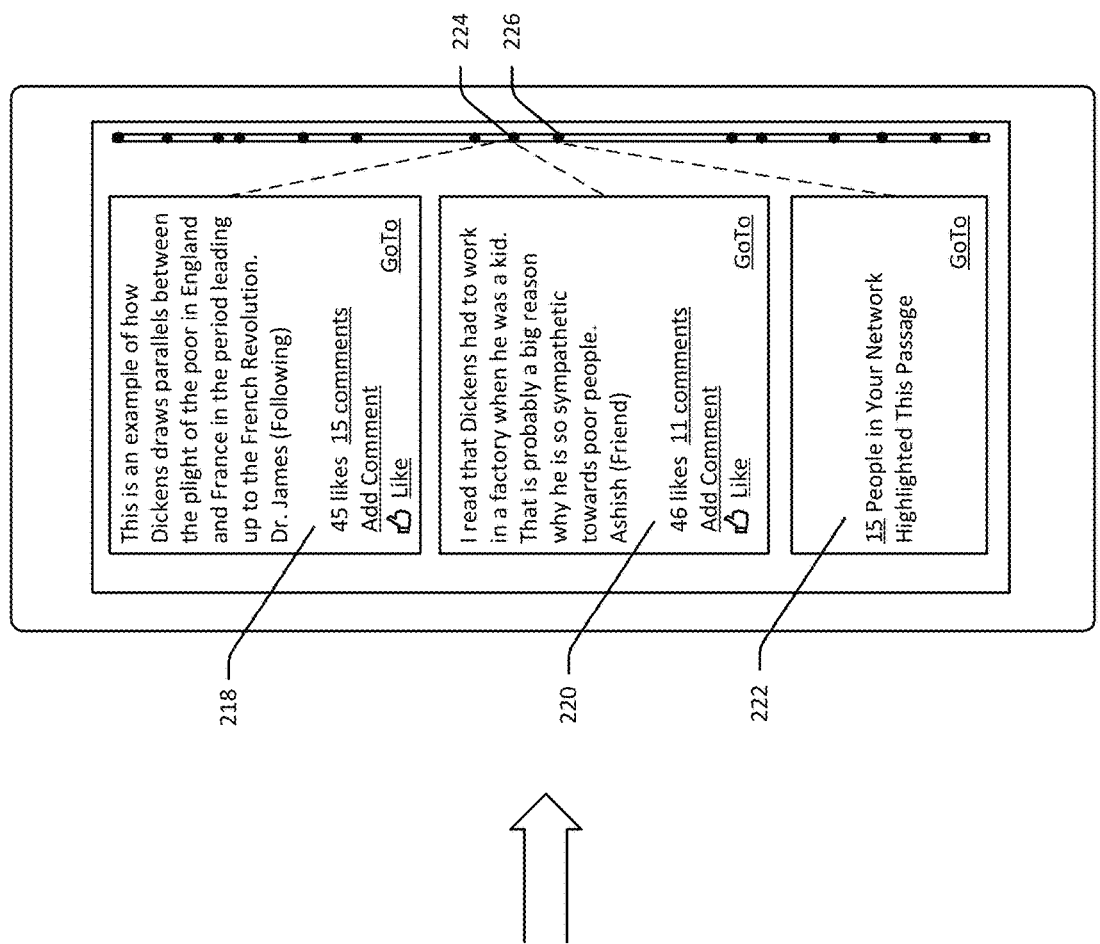
Figure 2B:
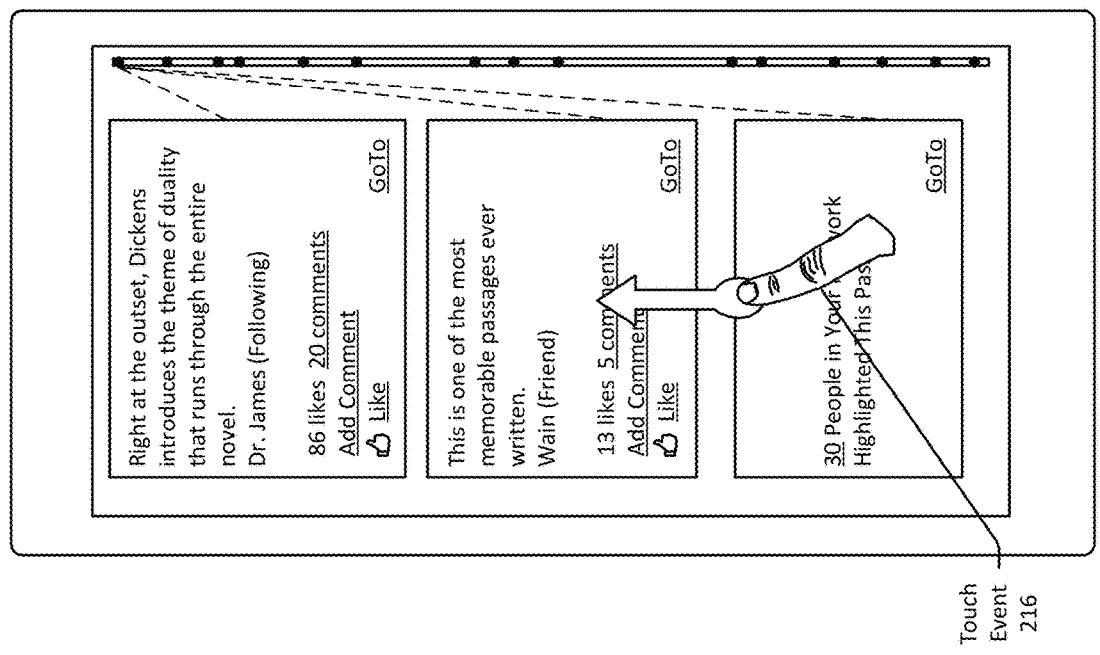

FIGS. 2A-2B are schematic diagrams illustrating example user interfaces that are rendered on a display of a user device associated with a first user profile and that display annotations associated with one or more other user profiles and example user interactions with the example user interfaces in accordance with one or more example embodiments of the disclosure.

In certain example embodiments, the additional annotations presented at block 814 of method 800 in response to the second user input received at block 812 may be presented within a graphical user interface (GUI) panel 200. More specifically, in response to the second user input received at block 812, the GUI panel 200 may be partially surfaced on the display 102 over a portion of rendered content 104. In response to a touch event 202, the GUI panel 200 may be fully exposed as shown in FIG. 2A on the user device on the right side of the diagram.

The GUI panel 200 may present multiple user interface objects containing annotations generated by different user profiles. In certain example embodiments, the first user interface object 208 may display the annotation 128 initially displayed inline with the content 104 (FIG. 1). However, in other example embodiments, the first user interface object 208 may display a different annotation from the annotation 128 displayed inline such as, for example, an annotation generated by a user profile associated with the next highest priority level. The GUI panel 200 may further display additional user interface objects 210, 212 containing additional annotations. Each of the user interface objects 208-212 may include additional metadata associated with the annotations, as previously described with respect to FIG. 1.

In addition, each user interface object may include a selectable element 214 that responsive to selection may cause the portion of the e-book to which annotation corresponds to be rendered, at least in part, on the display 102. The GUI panel 200 may further include a content map 204 that may include various indicators of different locations within the e-book. For example, each of the user interface objects 208-212 is depicted as corresponding to a particular location within the e-book, as represented by the indicator 206 of the content map 204. More specifically, each annotation or indication of a highlight contained in each user interface object may pertain to content at a particular location in the e-book. Accordingly, if the selectable element 214 is selected, content at a location in the e-book represented by the indicator 206 may be rendered on the display 102.

The GUI panel 200 may be scrollable allowing additional user interface objects containing additional annotations to be presented. Referring to FIG. 2B, in response to a touch event 216, the information displayed in the GUI panel 200 may change to reflect additional user interface objects 218-222 containing additional annotations, and optionally, additional metadata content associated with the additional annotations. The user interface objects 218-222 are illustratively shown as including annotations or indications of highlights that correspond to content at different locations in the e-book than the annotations contained in the user interface objects 208-212. For example, the annotation displayed in the user interface object 218 and the annotation displayed in the user interface object 220 may each correspond to a same location in the e-book as represented by the indicator 224. On the other hand, the annotation displayed in the user interface object 222 may correspond to a different location in the e-book as represented by the indicator 226 (perhaps a location that appears after the location represented by the indicator 224).

Figure 3:
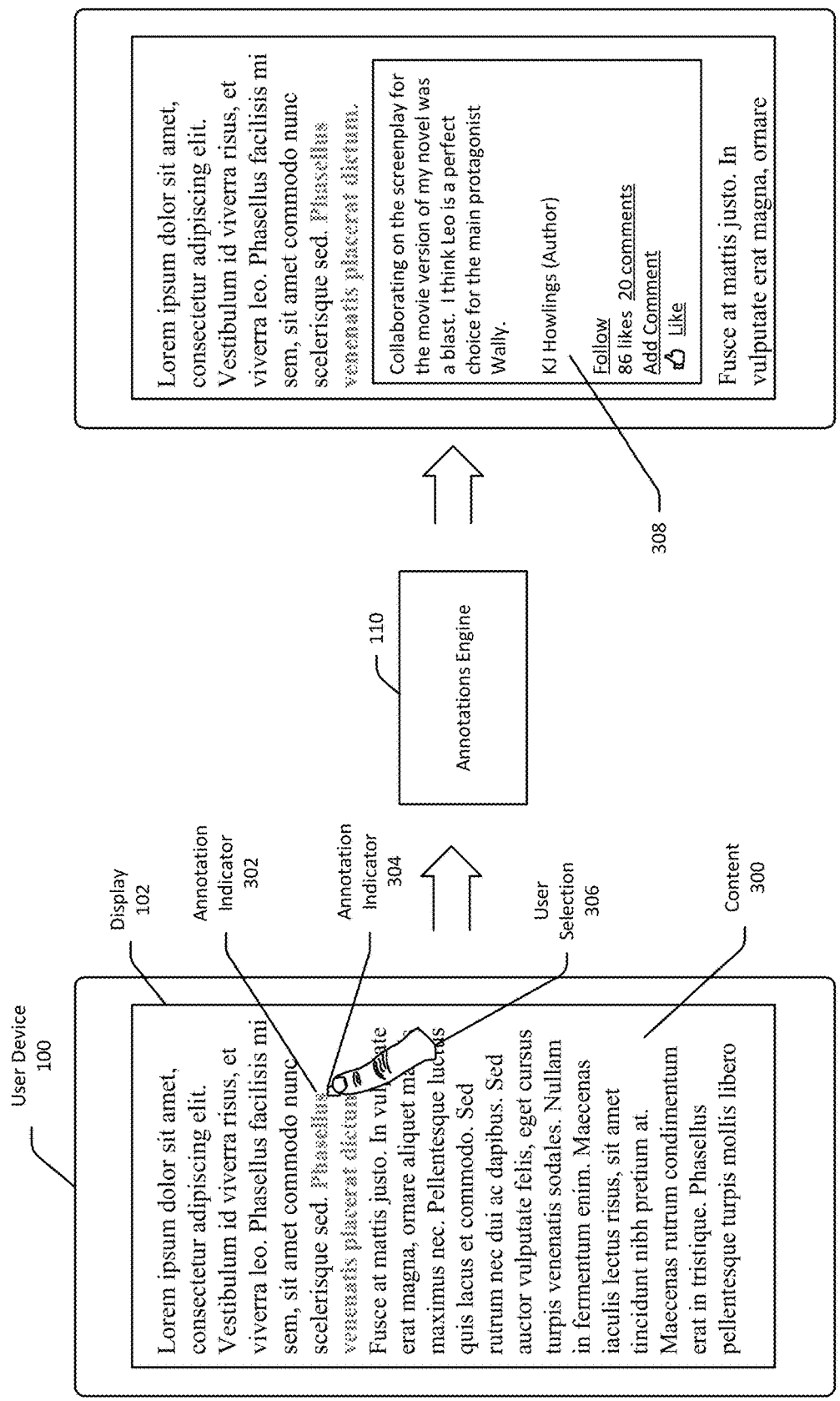
FIG. 3 is a schematic diagram illustrating a rendering, on a display of a user device, of digital content stored in association with a first user profile and a rendering of an annotation associated with a second user profile corresponding to a creator of the digital content inline with the digital content in accordance with one or more example embodiments of the disclosure.

FIG. 3 is a schematic diagram illustrating a rendering, on a display of a user device, of digital content stored in association with a first user profile and a rendering of an annotation associated with a second user profile corresponding to a creator of the digital content inline with the digital content in accordance with one or more example embodiments of the disclosure.

The user device 100 including the display 102 is once again depicted. Example content 300 is shown as being rendered on the display 102. A first annotations indicator 302 and a second annotations indicator 304 are shown as being rendered in association with the content 300. The first annotations indicator 302 may correspond to text displayed in a more conspicuous manner than other text forming part of the content 300. Thus, the first annotations indicator 302 may indicate the specific text for which one or more annotations are available for presentation. The second annotations indicator 304 may be a selectable indicator that responsive to user selection 306 may cause the annotations engine 110 to identify an annotation to be rendered inline with the content 300.

More specifically, a user interface object 308 may be rendered inline with the content 300. The user interface object may include an annotation generated by a user profile determined to have a highest priority level for display of annotations among user profiles that generated annotations for at least a portion of the content 300 and that are associated with the user profile accessing the content 300. For example, the annotation contained in the user interface object 308 may have been generated by a content creator (e.g., an author) of the content 300.

In certain example embodiments, a particular user profile may be associated with a default highest priority level. For example, a user profile associated with a content creator may be assigned a default highest priority level such that an annotation generated by the content creator is always displayed inline with corresponding digital content for all user profiles accessing the digital content. In other example embodiments, a priority level associated with a user profile may be determined based on various parameters such as, for example, a number of annotations generated by the user profile for a particular e-book, an amount of additional metadata generated by other user profiles and associated with annotations generated by the user profile, a level of positive user sentiment expressed in such additional metadata, and so forth. Further, in certain example embodiments, a priority level associated with a user profile may be determined based on a type of association between the user profile and the user profile accessing the content 300. For example, for a first user profile accessing content 300, a second user profile associated via a bidirectional association with a the first user profile may be assigned a higher priority level with respect to the first user profile than a third user profile associated via a unidirectional association with the first user profile. As such, the prioritization logic 124 may prioritize for display an annotation generated by the second user profile and associated with a portion of the content 300 over an annotation generated by the third user profile and associated with the portion of the content 300. More specifically, the annotation generated by the second user profile may be rendered inline with the portion of the content 300 based on the higher priority level associated with the second user profile.

FIGS. 4A-4D are schematic diagrams illustrating the receipt of message content from a first user profile associated with a first user device, the association of the message content with a portion of digital content specified by the first user profile, the receipt of input from the first user profile identifying a second user profile, and the delivery of the message content to a second user device for presentation to the second user profile in association with the portion of the digital content in accordance with one or more example embodiments of the disclosure.

Figure 4A:
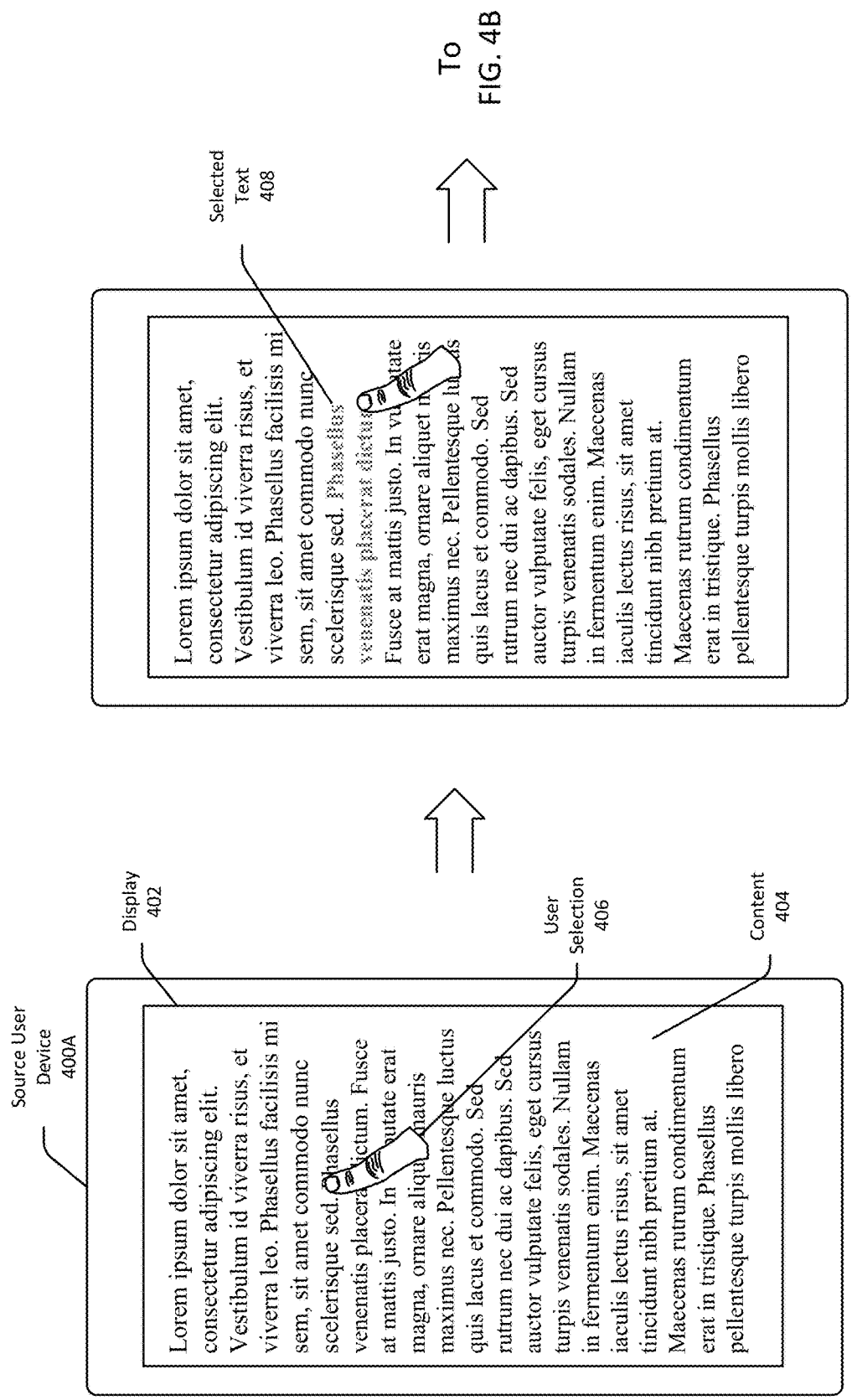

A source user device 400A is shown in FIG. 4A. The user device 400A may correspond, for example, to the user device 100. The user device 400A may include display 402 on which digital content 404 may be rendered. The digital content 404 may be stored on the user device 400A in association with a first user profile. Alternatively, or additionally, the content 404 may be stored on a remote server in association with the first user profile and accessed via one or more networks. A first user associated with a first user profile may provide user input 406 to the user device 400A indicative of a selection of a portion of the content 404. For example, the first user may provide touch input to a touch sensor of the device 400A via interaction with the display 402. The touch input may cause a portion of the content 404 to be highlighted or otherwise conspicuously identified as selected text 408.

Referring now to FIG. 4B, after the portion 408 of the digital content 404 is selected by the first user, a set of one or more graphical indicators may be displayed as an overlay over the content 404. The set of one or more graphical indicators may include an indicator 410 associated with functionality for generating message content corresponding to the selected portion 408 of the digital content 404, an indicator 412 associated with functionality for generating metadata content (e.g., an annotation) associated with the selected portion 408 of the digital content 404, and so forth. A user selection 414 of the graphical indicator 410 may initiate a process for receiving message content for association with the selected portion 408 of the digital content 404 and for receiving a selection of recipient(s) to whom the message content is to be delivered.

More specifically, responsive to selection 414 of the indicator 410, an overlay 416 may be presented. Within the overlay 416, indications of various user profiles associated with the first user profile may be presented. The first user may select one or more user profiles as recipients of message content anchored to the selected portion 408 of the message content. The user profile(s) selected as recipients of the message content may be selected from a predetermined listing 420 of user profiles associated with the first user profile (e.g., a contact list or social network of the first user profile) or may be specified via character entry in an appropriate field 418. In certain example embodiments, a group of user profiles may be selected, in which case, each user profile included in the group may be designated as a recipient of the message content. Further, in certain example embodiments, an information exchange session (e.g., a chat session) may be initiated between the selected recipient user profile(s) and the first user profile.

Figure 4C:
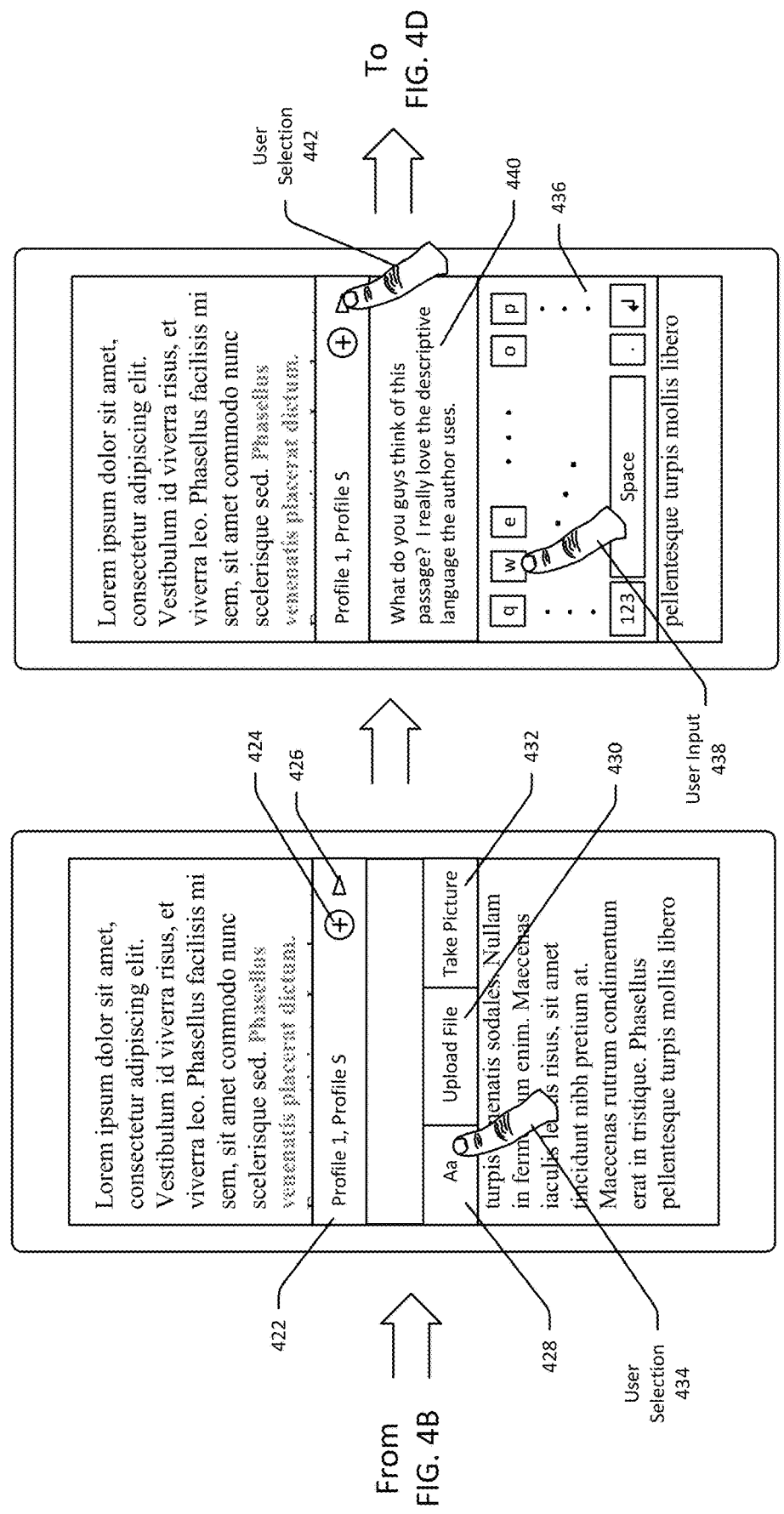

Referring now to FIG. 4C, after at least one recipient user profile is selected, an overlay may be presented that includes an indication 422 of the selected recipient(s). A selectable UI element 424 may be displayed that may be selected to add additional recipient user profiles. In addition, various selectable UI elements may be displayed for providing message content. For example, a first selectable element 428 may be selected to provide input in the form of textual content. In addition, a second selectable element 430 may be selected to upload a file to be included in the message. The file may include audio content, video content, image content, textual content, or the like. As another example, a third selectable element 432 may be selected to capture image, video, and/or audio content to be included in the message. A selectable UI element 426 for initiating delivery of the message content to each recipient user profile may also be provided.

Responsive to selection of, for example, the selectable UI element 428, a virtual keyboard 436 may be surfaced on the display 402. The first user may provide user input 438 (e.g., touch input) to generate textual content 440 for the message. Although not depicted in FIG. 4C, audio, video, and/or image content may also be provided, as previously described. A user selection 442 of the selectable UI element 426 may then initiate delivery of the message to the selected recipient user profiles, or more specifically, to user devices associated with the selected recipient user profiles. In addition to the message content, anchor data including, for example, a set of position identifiers representing the selected portion 408 of the digital content 404 to which the message content relates may also be sent to the recipient user profile devices.

Figure 4D:
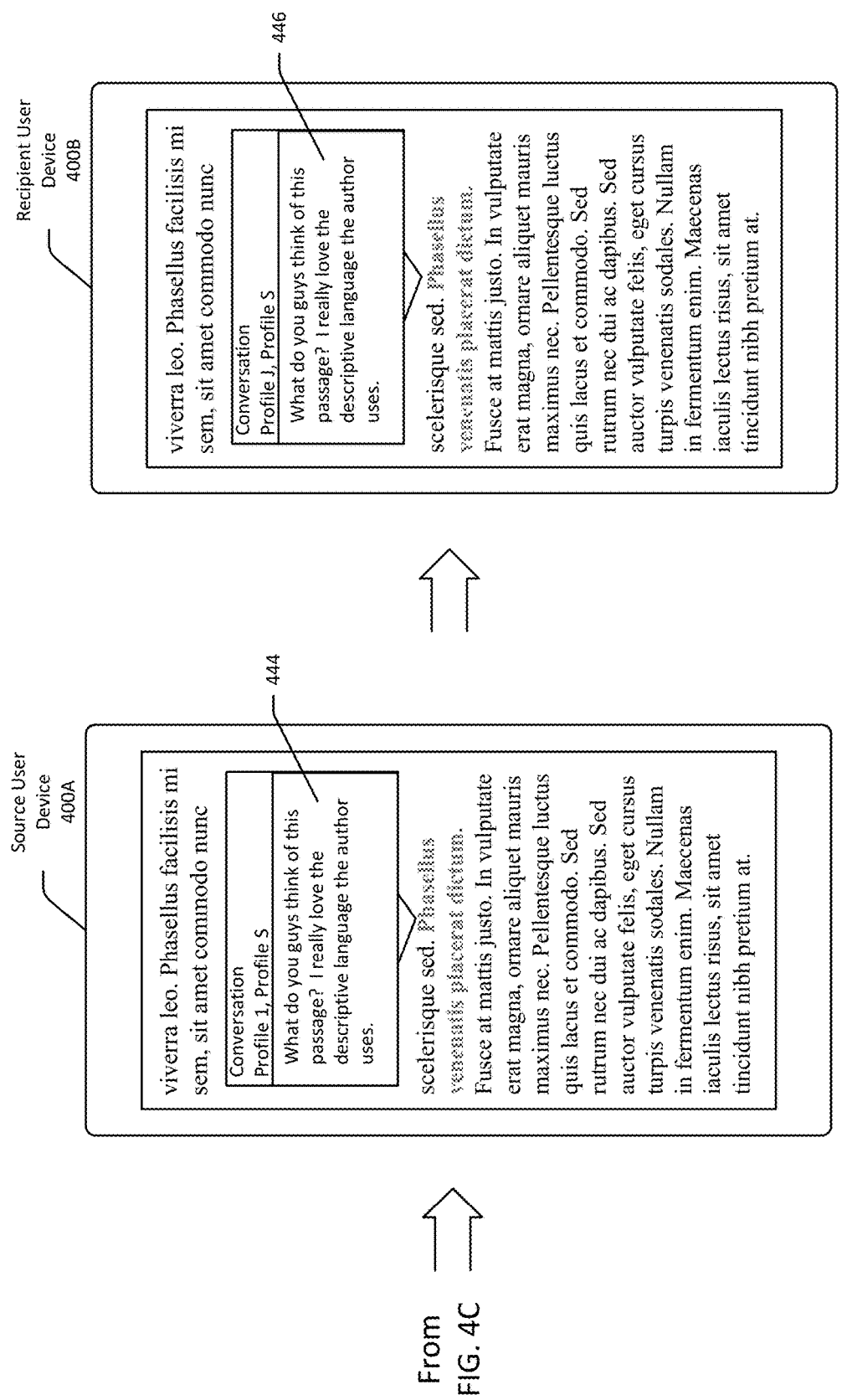

Referring now to FIG. 4D, the message content may be presented inline with the digital content 404 that includes the selected portion 408. For example, the message content may be presented inline with the digital content 404 when that content 404 is rendered on a user device 400B associated with a recipient user profile. The message content may be presented within a user interface (UI) object 446. The selected portion 408 of the digital content 404 to which the message content relates may be highlighted or otherwise conspicuously displayed, and the UI object 446 may include an indication that the UI object 446 is associated with the highlighted or otherwise conspicuously displayed portion 408. The UI object 446 may provide a capability for the recipient user profile(s) to engage in an information exchange session (e.g., a chat session) with each other and with the first user profile that generated the message content. For example, the UI object 446 may be selectable, and responsive to selection, an expanded representation of the UI object may be presented (not shown). A user associated with a recipient user profile may provide additional message content via the expanded representation of the UI object, and the additional message content may be associated with the message content specified by the first user profile. In a similar manner, any participant in the information exchange session (e.g., any recipient user profile) may provide additional message content via the expanded UI object for association with the information exchange session. A corresponding UI object 444 may be presented inline with the content 404 on the source user device 400A associated with the first user profile as well. In this manner, the first user profile may participate in the information exchange session.

In certain example embodiments, the digital content 404 may not be downloaded on the user device 400B associated with a recipient user profile. In such example embodiments, a notification may be sent to the user device 400B, and the notification may be presented outside of the context of a digital content consumption application (e.g., an e-reader application). For example, the notification may be presented in a notifications menu on the device 400B. The notification may indicate that another user profile has generated message content and has designated the recipient user profile for receipt of the message content. The notification may further provide a mechanism (e.g., may include a selectable uniform resource locator (URL)) for initiating a download of the digital content and/or initiating a download of a dedicated application (e.g., a mobile application) for viewing the digital content. Additionally, or alternatively, the notification may provide a mechanism for viewing the digital content in a web-based application. When the digital content 404 is ultimately accessed on the user device 400B, the UI object 446 may be presented inline with the content 404.

In certain example embodiments, the UI objects 444, 446 may no longer be presented inline with the content 404 if various conditions are not met. For example, if the information exchange session has been inactive for some predetermined period of time (e.g., no user profile has generated new message content for association with existing message content of the information exchange session), the UI objects 444, 446 may no longer be presented inline. However, the message content may nonetheless be accessible via, for example, the GUI panel 200. In addition, a user may be able to customize preferences associated with his/her user profile to specify whether such UI objects should be displayed inline or in, for example, the GUI panel 200. It should be appreciated that the above discussion relating to notifications sent to user devices associated with user profiles that have not downloaded the digital content 404 or an application for viewing the digital content 404 is also applicable to notifications of metadata items (e.g., annotations). Moreover, the above discussion relating to customization of user profile preferences for display of message content is also applicable to metadata items as well.

Figure 5:
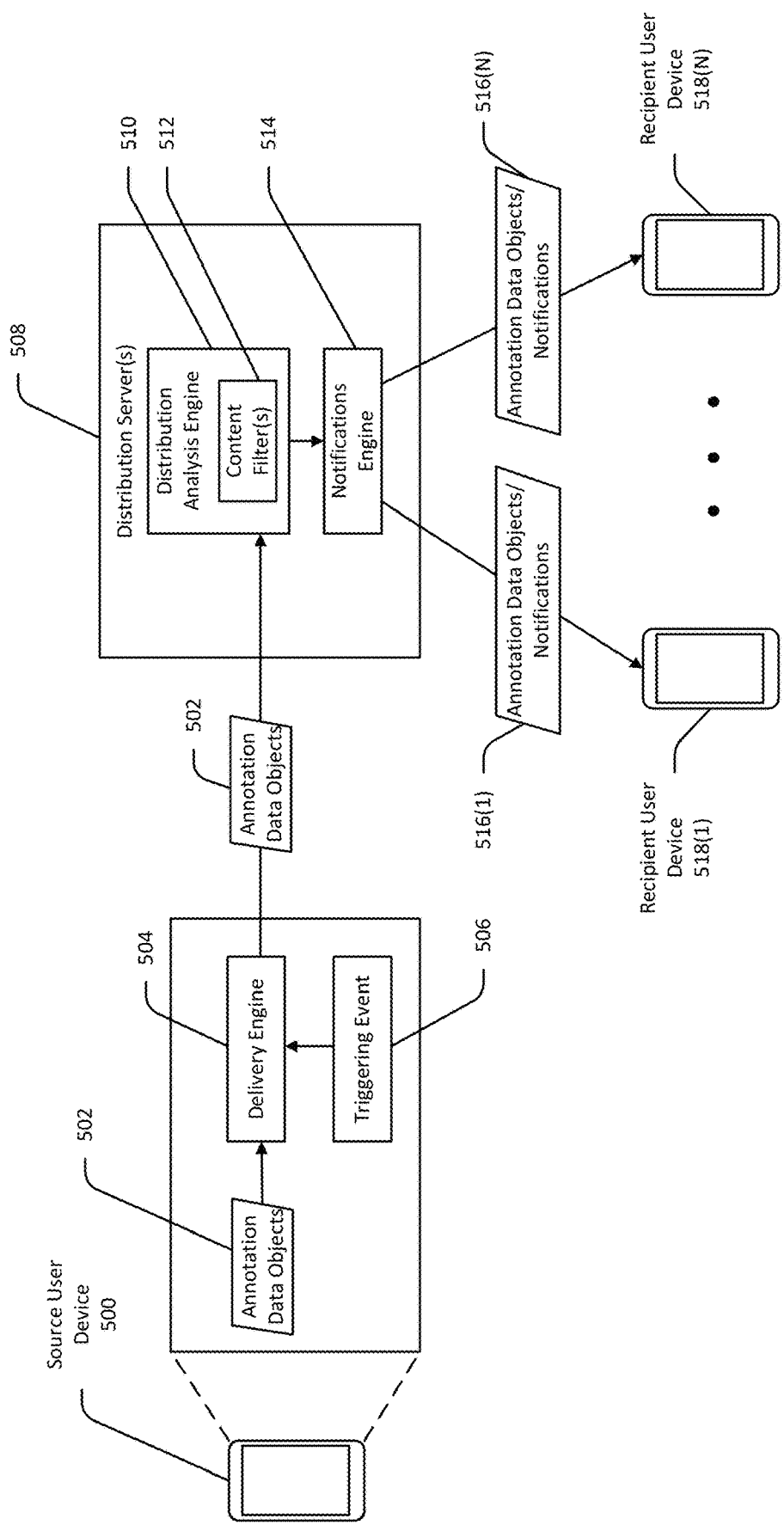
FIG. 5 is a schematic diagram illustrating generation of annotations on a user device associated with a first user profile, delivery of the annotations to a distribution server, and distribution of the annotations and/or notifications to user devices associated with other user profiles in accordance with one or more example embodiments of the disclosure.
Figure 9:
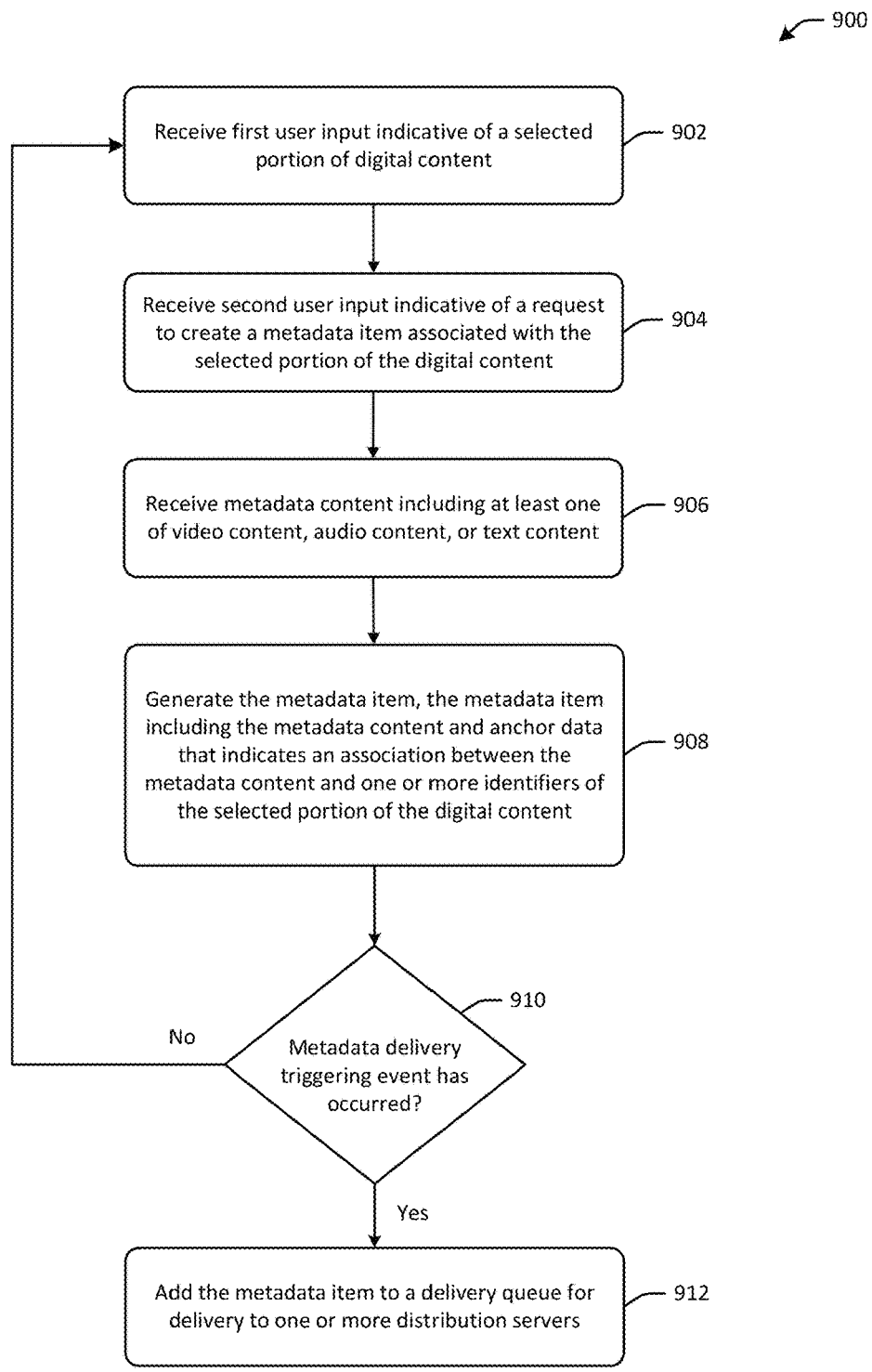
FIG. 9 is a process flow diagram of an illustrative method for generating a metadata item associated with a first user profile and sending the metadata item to a distribution server for distribution to one or more other user profiles in accordance with one or more example embodiments of the disclosure.

FIG. 5 is a schematic diagram illustrating generation of annotations on a user device associated with a first user profile, delivery of the annotations to a distribution server, and distribution of the annotations and/or notifications to user devices associated with other user profiles in accordance with one or more example embodiments of the disclosure. FIG. 9 is a process flow diagram of an illustrative method 900 for generating a metadata item associated with a first user profile and sending the metadata item to a distribution server for distribution to one or more other user profiles in accordance with one or more example embodiments of the disclosure. FIG. 9 will be described hereinafter in conjunction with FIG. 5.

Referring to FIGS. 5 and 9, the method 900 may be performed to generate a metadata item on a source user device 500. In certain example embodiments, the metadata item may be an annotation data object that includes an annotation and anchor data.

At block 902, the source user device 500 may receive first user input indicative of a selected portion of digital content. For example, the source user device 500 may receive first user input indicating a selected portion of text in an e-book, a selected location of content in the e-book, or the like.

At block 904, the source user device 500 may receive second user input indicative of a request to create a metadata item associated with the selected portion of the digital content. For example, the second user input may be indicative of a request to create an annotation data object associated with the selection portion of e-book content. The second user input may correspond to, for example, selection of a selectable user interface element that generates the request to create the metadata item.

At block 906, the source user device 500 may receive metadata content pertaining to the selected portion of the digital content. The metadata content may include video content, audio content, text content, graphical content, or the like. The metadata content may be provided by a user. For example, the user may input text content into the source user device 500 and/or may upload multimedia content to the source user device 500 or select existing multimedia content stored on the source user device 500.

At block 908, the source user device 500 may generate the metadata item. Generating the metadata item may include generating anchor data. The anchor data may indicate an association between the metadata content and one or more identifiers of the selected portion of the digital content. The metadata content and the anchor data may be included in the metadata item. For example, the metadata content may include an annotation to a selected portion of an e-book. The anchor data may include a set of position identifiers including a start position of the selected portion of the e-book content and an end position of the selected portion of the e-book content. Upon generating the metadata item, the metadata item may be stored.

At block 910, the source user device 500, or more specifically, a delivery engine 504 of the source user device 500 may determine whether a metadata delivery triggering event 406 has occurred. The triggering event may be, for example, a threshold period of time elapsing since the metadata item was generated, a threshold number of metadata items having been generated and associated with a user profile, a threshold number of metadata items having been generated for a particular portion of the digital content, a threshold number of other user profiles associated with the user profile, and so forth.

If the delivery engine 504 determines that the triggering event 506 has occurred, the delivery engine 504 may add the metadata item generated at block 910, as well as any other metadata items awaiting delivery, to a delivery queue which may cause the metadata item(s) to be sent to one or more distribution servers 508. In certain example embodiments, the metadata items generated by the source user device 500 and sent to the distribution server(s) 508 may be annotation data objects containing annotations of digital content such as e-book content and anchor data indicating which portions of the digital content the annotations pertain to. Referring again to block 910, if the delivery engine 504 determines that the triggering event 506 has not occurred, the operations at blocks 902-910 may be performed iteratively and additional metadata items may be generated. The metadata items may be delivered to the distribution server(s) 508 responsive to a positive determination at block 910.

Figure 10:
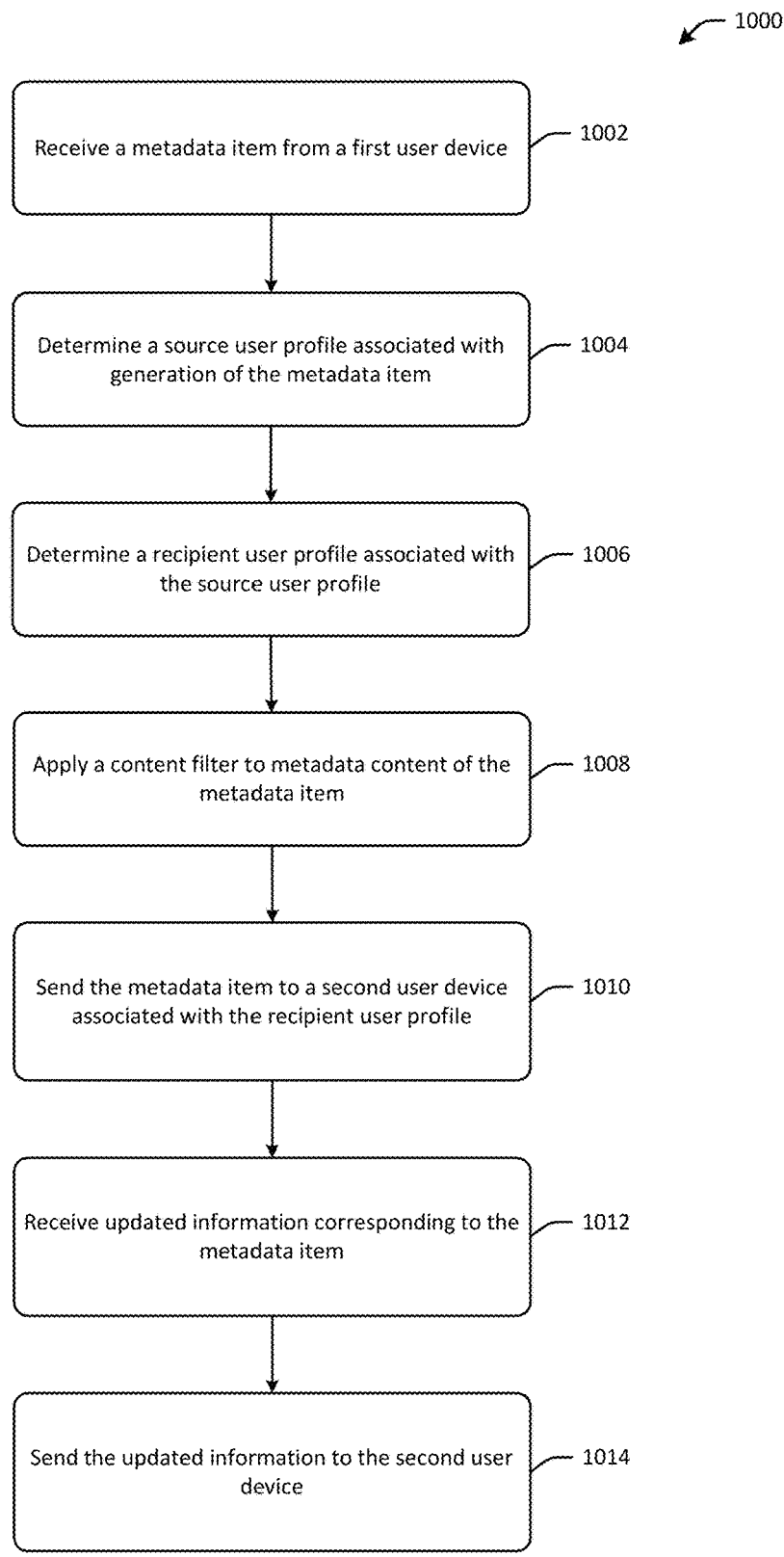
FIG. 10 is a process flow diagram of an illustrative method for receiving a metadata item from a first user device associated with a source user profile, determining a recipient user profile associated with the source user profile, and sending the metadata item to a second user device associated with the recipient user profile in accordance with one or more example embodiments of the disclosure.

FIG. 10 is a process flow diagram of an illustrative method 1000 for receiving a metadata item from a first user device associated with a source user profile, determining a recipient user profile associated with the source user profile, and sending the metadata item to a second user device associated with the recipient user profile in accordance with one or more example embodiments of the disclosure. FIG. 10 will be described hereinafter in conjunction with FIG. 5.

Referring now to FIGS. 5 and 10, at block 1002, the distribution server(s) 508 may receive a metadata item from a first user device. For example, the distribution server(s) 508 may receive an annotation data object 502 from the source user device 500. At block 1004, a distribution analysis engine 510 of the distribution server(s) 508 may determine a source user profile associated with generation of the metadata item. In certain example embodiments, the distribution analysis engine 510 may determine the source user profile based on a device identifier associated with the source user device 500. For example, the distribution analysis engine 510 may receive a MAC address, IP address, or the like from the source user device 500 and may perform a database lookup using the device identifier to identify a source user profile identifier stored in association with the device identifier. In other example embodiments, the metadata item received from the source user device 500 may include an identifier of the source user profile that generated the metadata item.

At block 1006, the distribution analysis engine 510 may determine a recipient user profile associated with the source user profile. As previously described, the recipient user profile may be associated with the source user profile via a bidirectional association or a unidirectional association. At block 1008, the distribution analysis engine 510 may apply one or more content filters 512 to the metadata content included in the metadata item. For example, a content filter may be applied to an annotation included in an annotation data object 502. In certain example embodiments, content that does not satisfy requirements of a content filter may be excluded from the metadata content or modified to satisfy requirements of the content filter, while in other example embodiments, if any portion of the metadata content fails to satisfy the requirements of a content filter, the entire metadata content may be rejected. In such example embodiments, a notifications engine 514 may send a notification to the source user device 500 indicating that the metadata content was rejected. Method 1000, however, assumes the metadata content satisfies the content filter requirements.

After application of the content filter(s) 514 to the metadata content of a metadata item, the notifications engine 514 may, in response to an instruction received from the distribution analysis engine 510, send the metadata item to a second user device associated with the recipient user profile at block 1010. More particularly, the notifications engine 514 may send the metadata item to any number of recipient user devices associated with any number of recipient user profiles associated with the source user profile. For example, the notifications engine 514 may send a respective instance of the annotation data object 516(1)-516(N) to each recipient user device 518(1)-518(N).

At block 1012, the distribution server(s) 508 may receive updated information corresponding to the metadata item received at block 1002. The updated information may include, for example, additional metadata associated with the metadata content included in the metadata item. For example, the updated information may include commentary, user sentiment metadata, or the like for an annotation included in an annotation data object 502. At block 1014, the notifications engine 514 may send the updated information to each user device that received the metadata item.

Figure 11:
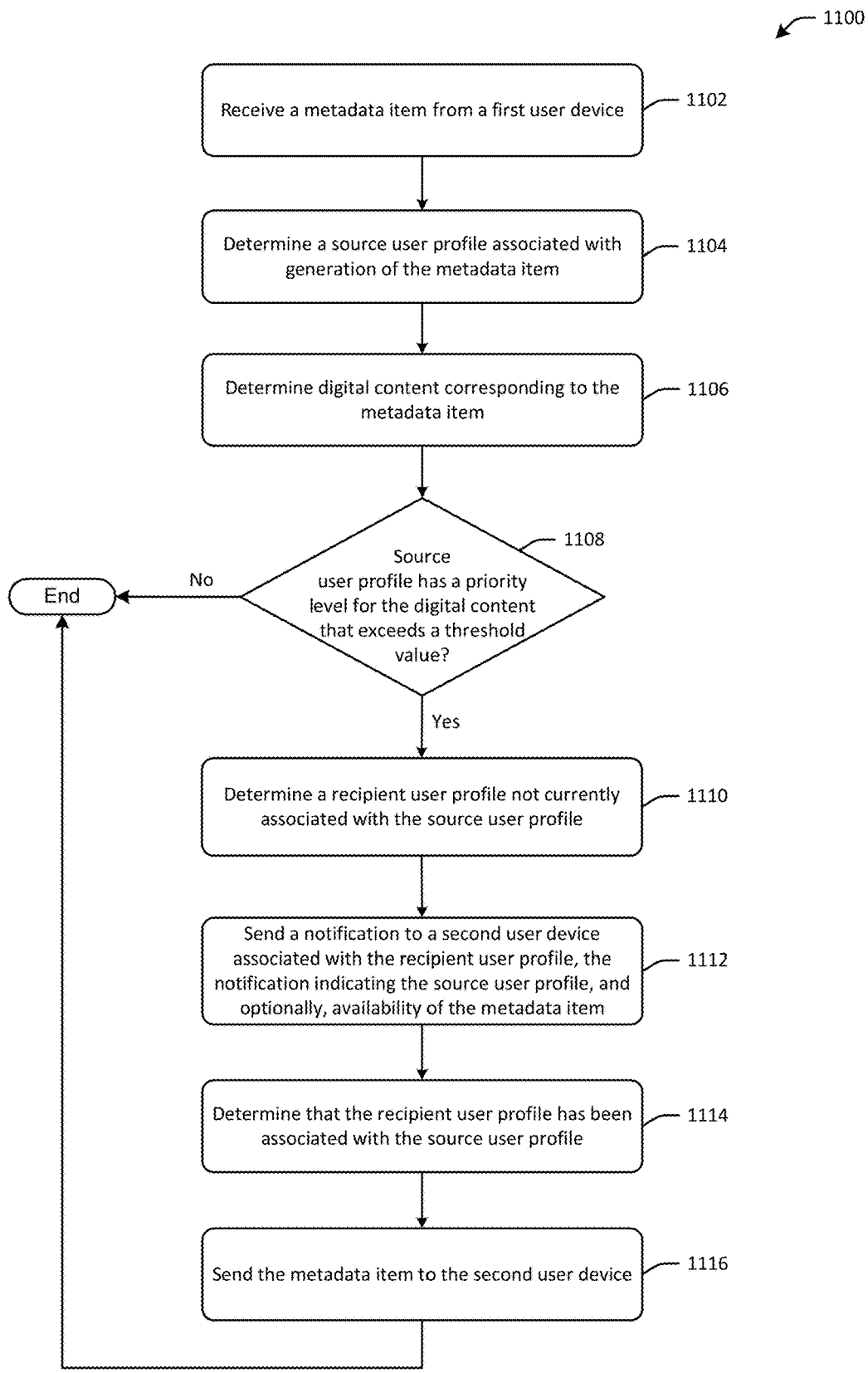
FIG. 11 is a process flow diagram of an illustrative method for receiving a metadata item from a first user device associated with a source user profile, determining that the source user profile has a priority level that exceeds a threshold value, determining a recipient user profile not associated with the source user profile, and sending a notification of the availability of the metadata item to a second user device associated with the recipient user profile in accordance with one or more example embodiments of the disclosure.

FIG. 11 is a process flow diagram of an illustrative method 1100 for receiving a metadata item from a first user device associated with a source user profile, determining that the source user profile has a priority level that exceeds a threshold value, determining a recipient user profile not associated with the source user profile, and sending a notification of the availability of the metadata item to a second user device associated with the recipient user profile in accordance with one or more example embodiments of the disclosure. FIG. 11 will be described hereinafter in conjunction with FIG. 5.

Referring now to FIGS. 5 and 11 in conjunction with one another, at block 1102, the distribution server(s) 508 may receive a metadata item (e.g., an annotation data object 502) from the source user device 500. At block 1104, the distribution analysis engine 510 may determine a source user profile associated with generation of the metadata item. At block 1106, the distribution analysis engine 510 may determine digital content corresponding to the metadata item.

At block 1108, the distribution analysis engine 510 may determine whether the source user profile has an associated priority level for the digital content that exceeds a threshold value. The source user profile may have a priority level for the digital content that exceeds the threshold value if, for example, the source user profile is associated with a content creator (e.g., an author) of the digital content. In certain example embodiments, the priority level of the source user profile may not be assessed in relation to the digital content. For example, a source user profile may be associated with a threshold number of annotations for multiple e-books, in which case, in certain example embodiments, the source user profile may have a priority level that exceeds the threshold value for any item of digital content.

In response to a negative determination at block 1108, the method 1100 may end. However, in response to a positive determination at block 1108, the method 1100 may proceed to block 1110, where the distribution analysis engine 510 may determine a recipient user profile not currently associated with the source user profile. For example, the recipient user profile may be associated with a user that has not established a unidirectional association with a user corresponding to the source user profile (e.g., a content consumer that has not become a follower of a content creator).

At block 1112, the notifications engine 514 may send a notification (e.g., notification 516(1)) to a recipient user device (e.g., recipient user device 518(1)) associated with the recipient user profile. The notification may indicate the source user profile, and optionally, availability of the metadata item generated by the source user profile. At block 1114, the distribution analysis engine 512 may determine that the recipient user profile has now become associated with the source user profile. At block 1116, the notifications engine 514 may send the metadata item to the recipient user profile. Thus, method 1100 provide a mechanism via which source user profiles associated with high priority levels can be recommended for association with recipient user profiles such that upon establishing an association, the recipient user profiles can receive metadata items (e.g., annotation data objects) generated by the source user profiles.

Figure 6:
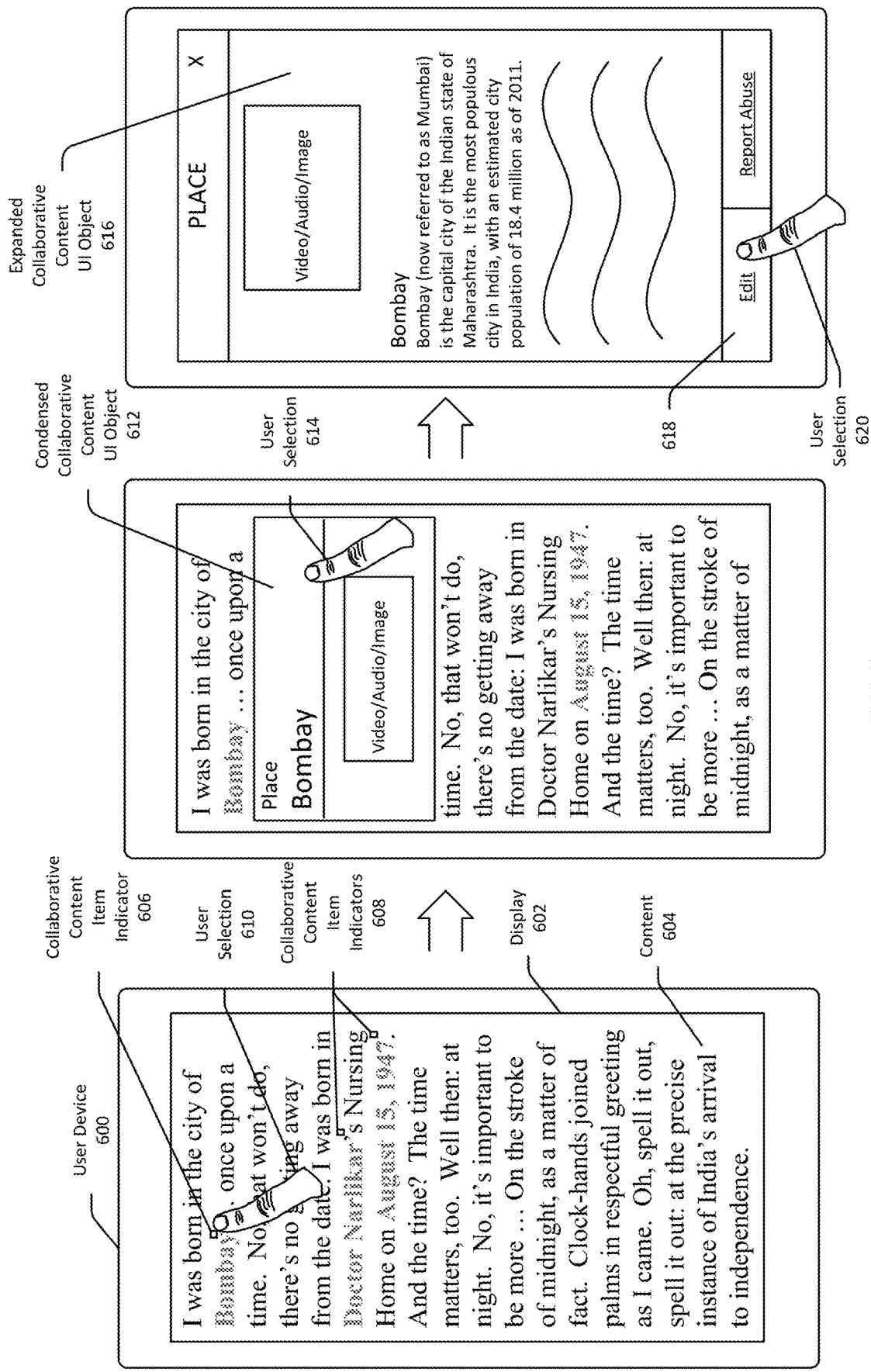
FIG. 6 is a schematic diagram illustrating a rendering of collaborative content corresponding to digital content on a display of a user device in accordance with one or more example embodiments of the disclosure.

FIG. 6 is a schematic diagram illustrating a rendering of collaborative content corresponding to digital content on a display of a user device in accordance with one or more example embodiments of the disclosure.

An example user device 600 is depicted in FIG. 6. In certain example embodiments, the user device 600 may correspond to the user device 100. Digital content 604 is shown in FIG. 6 as being rendered on a display 602 of the user device 600. Various collaborative content indicators 606, 608 may also be rendered on the display 602 in association with the content 604. More specifically, each of the collaborative content indicators 606, 608 may be rendered in association with a corresponding word or phrase of the content 604 and may indicate that a collaborative content item exists for the word or phrase or that the word or phrase is candidate for generation of a corresponding collaborative content item. The word or phrase for which a collaborative content item may be generated may include, but is not limited to, a person, place, thing, date, concept, quote, or the like that appears in the content 604. The collaborative content indicators 606, 608 may include graphical indicators and/or modifications to the corresponding word or phrase that make the word or phrase appear more conspicuous in relation to other portions of the content 604.

Upon user selection 610 of a collaborative content indicator (e.g., the indicator 606), a condensed collaborative content user interface object 612 may be rendered on the display 602. In certain example embodiments, the user interface object 612 may be rendered inline with the content 604. Although not depicted in FIG. 6, in certain example embodiments, a graphical indication of the word or phrase to which the user interface object 612 relates may also be rendered. The user interface object 612 may include an indication of the word or phrase to which it relates as well as some collaborative content associated with the word or phrase such as, for example, video, audio, or image content.

The user interface object 612 may be selectable. In response to a user selection 614, an expanded collaborative content user interface object 616 may be rendered as an overlay over the content 604 initially rendered on the display 602. The user interface object 616 may include additional collaborative content associated with the word or phrase such as, for example, a text description of the word or phrase. The user interface object 616 may include a user-selectable user interface element 618 that may make the collaborative content editable in response to a user selection 620.

The collaborative content of the collaborative content item represented by the user interface object 616 may be editable by any number of user profiles having access to the content 604. The terms collaborative content and user-generated content may at times be used interchangeably herein. In certain example embodiments, digital content may be processed to identify various words or phrases in the digital content that are candidates for generation of corresponding collaborative content items. For example, a word or phrase may be determined to be a candidate for a collaborative content item if the word or phrase appears more than a threshold number of times in digital content. As another example, a word or phrase may be determined to be a candidate for a collaborative content item if the word or phrase appears in more than a threshold number of third-party content sources referencing the digital content. As yet another example, a word or phrase may be determined to be a candidate for a collaborative content item if the word or phrase is associated with a threshold amount of other metadata content (e.g., a threshold number of annotations). It should be appreciated that the above examples are merely illustrative and not exhaustive.

Figure 7:
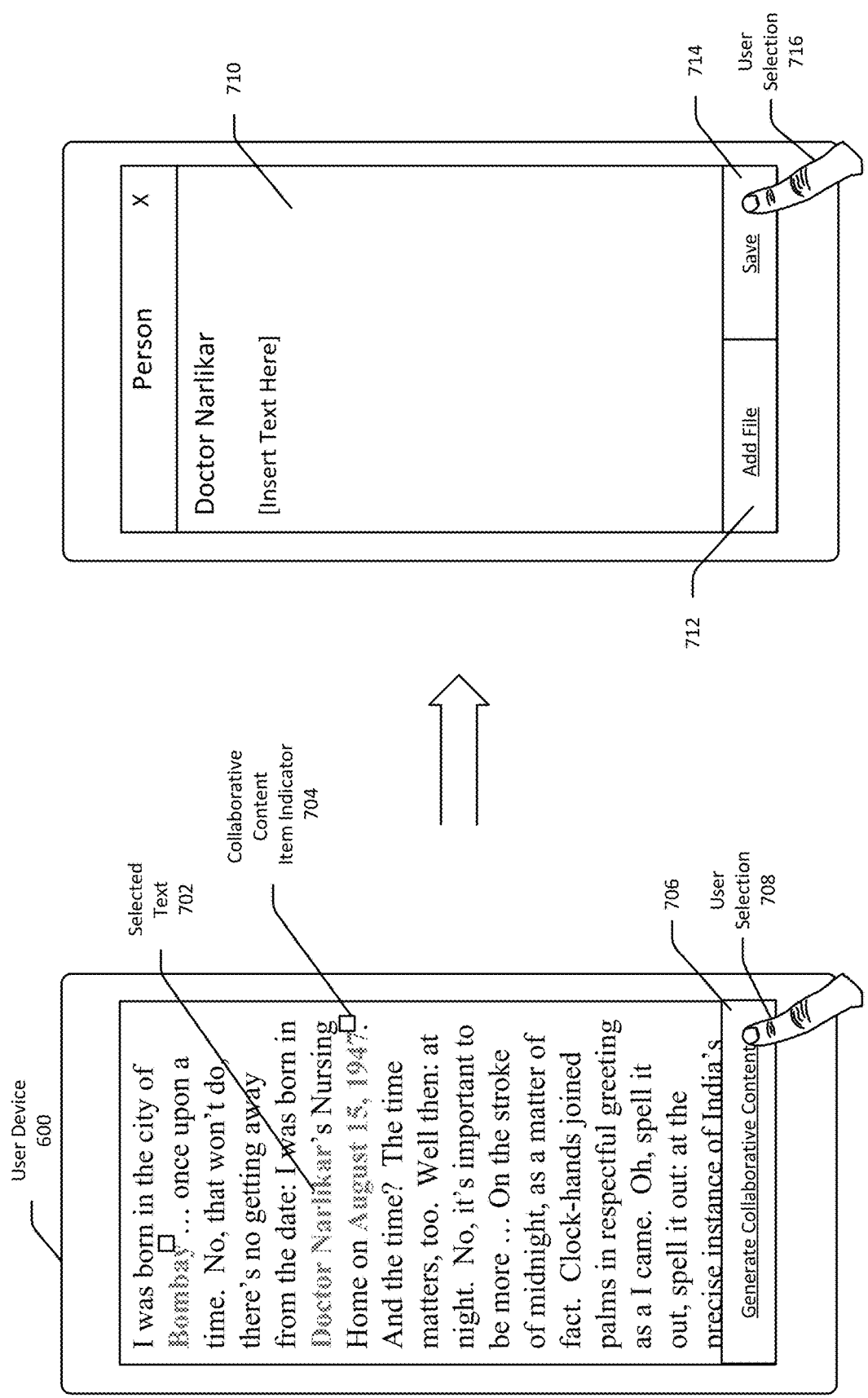
FIG. 7 is a schematic diagram illustrating example user interfaces for selecting digital content rendered on a display of a user device and generating collaborative content corresponding to the selected digital content in accordance with one or more example embodiments of the disclosure.
Figure 12:
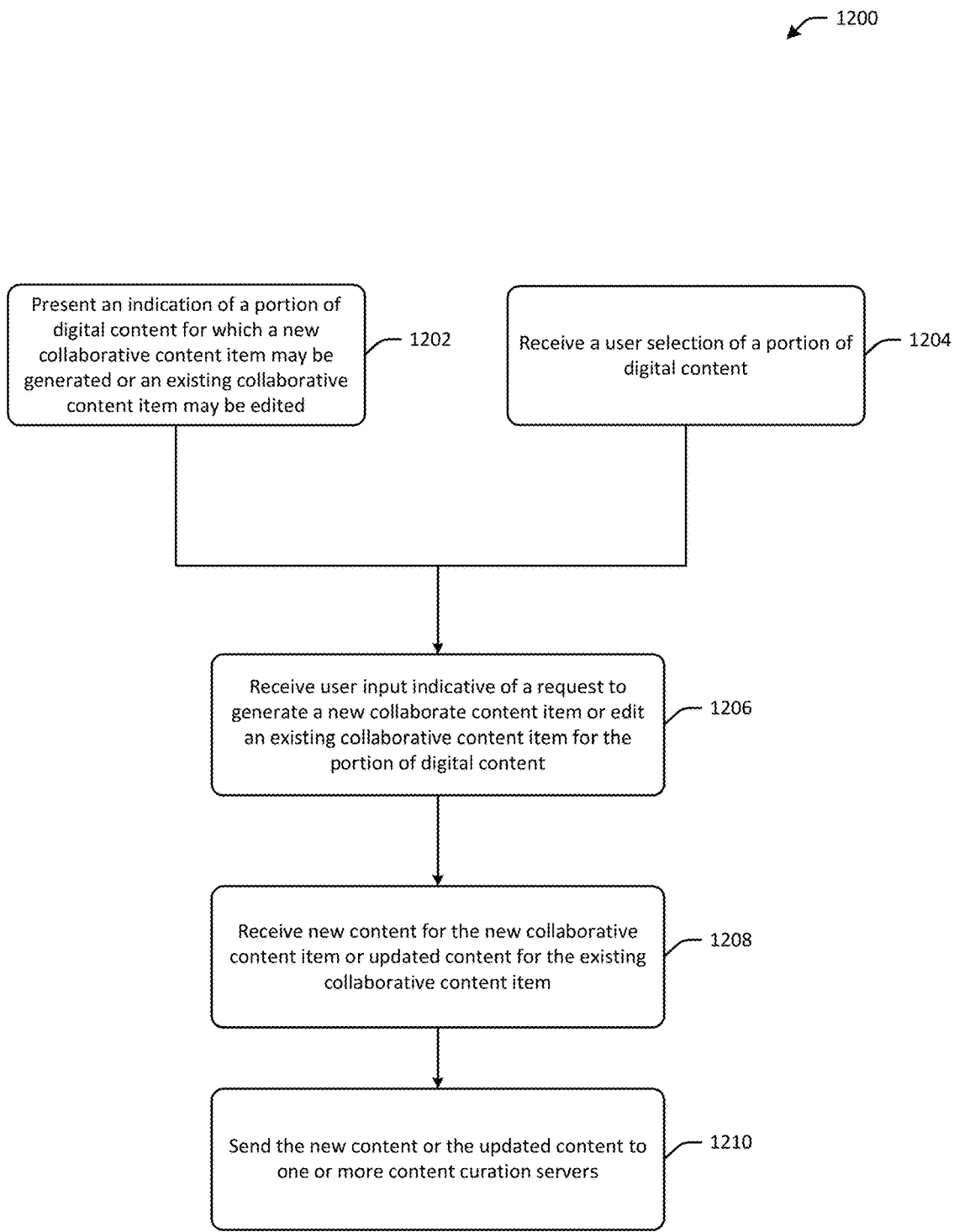
FIG. 12 is a process flow diagram of an illustrative method for receiving new content or edited content for a collaborative content item corresponding to a portion of digital content and sending the received content to one or more content curation servers in accordance with one or more example embodiments of the disclosure.

FIG. 7 is a schematic diagram illustrating example user interfaces for selecting digital content rendered on a display of a user device and generating collaborative content corresponding to the selected digital content in accordance with one or more example embodiments of the disclosure. FIG. 12 is a process flow diagram of an illustrative method 1200 for receiving new content or edited content for a collaborative content item corresponding to a portion of digital content and sending the received content to one or more content curation servers in accordance with one or more example embodiments of the disclosure. FIGS. 7 and 12 will be described hereinafter in conjunction with one another.

Referring to FIGS. 7 and 12, at block 1202, the user device 600 may present an indication of a portion of digital content for which a new collaborative content item may be generated or an existing collaborative content item may be edited. For example, a collaborative content item indicator 704 may be rendered on the display 602 of the user device 600 and may indicate that there is an existing collaborative content item for the date "Aug. 15, 1947" or that the character string "Aug. 15, 1947" is a candidate for generation of a new collaborative content item. In certain example embodiments, the indicator 704 may not be present, but rather than word or phrase for which an existing collaborative content item exists or for which a new collaborative content item may be created may be more conspicuously rendered than surrounding content. In addition to, or as an alternative to, the operation at block 1202, a user selection of a portion of digital content may be received at block 1204. For example, the selected text 702 may be the character string "Dr. Narlikar" which may be representative of a character in the digital content.

At block 1206, the user device 600 may receive user input indicative of a request to generate a new collaborative content item or edit an existing collaborative content item for the portion of content (e.g., a word or phrase in the content). For example, a user-selectable user interface element 706 may be rendered on the display 602 and in response to a user selection 708 may cause a user interface 710 to be presented.

At block 1208, the user device 600 may receive new content for a new collaborative content item for word or phrase or updated content for an existing collaborative content item for the word or phrase. A user-selectable user interface element 712 (e.g., button) may be provided for inserting a file (e.g., audio, video, images, etc.) as part of the new content or the updated content. In addition, a user-selectable user interface element 714 may be provided for saving the new content or updated content. In response to user selection 716 of the user interface element 714, the user device 600 may send the new or updated content to one or more content curation servers at block 1210.

Figure 13:
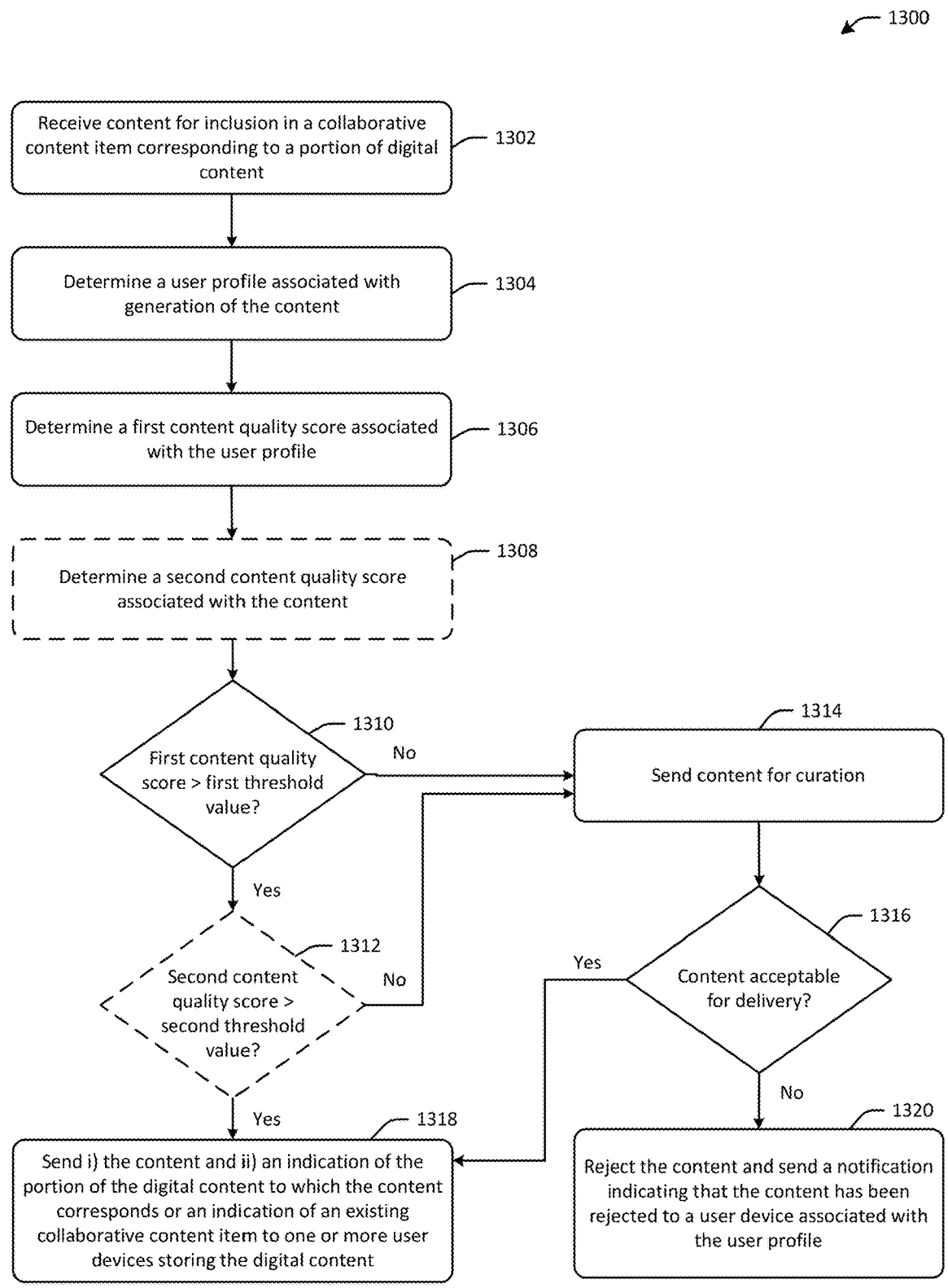
FIG. 13 is a process flow diagram of an illustrative method for receiving content for a collaborative content item corresponding to digital content, determining a user profile associated with the content, determining a content quality score associated with the user profile, and determining whether the content is to be curated prior to delivery to one or more user devices storing the digital content in accordance with one or more example embodiments of the disclosure.

FIG. 13 is a process flow diagram of an illustrative method 1300 for receiving metadata content for a collaborative content item corresponding to digital content, determining a user profile associated with the metadata content, determining a content quality score associated with the user profile, and determining whether the metadata content is to be curated prior to delivery to one or more user devices storing the digital content in accordance with one or more example embodiments of the disclosure.

A user may provide user input representative of content for a new collaborative content item or edited content for an existing collaborative content item. Prior to incorporating the edited content into an existing collaborative content item or generating a new collaborative content item with new content, the user-specified content may be associated with a user profile of the user and sent from the user device that receives the content to one or more content curation servers to determine whether the content is acceptable for inclusion in a collaborative content item for the associated word or phrase to which the content relates.

At block 1302, a content curation server may receive content from a user device for inclusion in a collaborative content item corresponding to a portion of digital content. At block 1304, the content curation server may determine the user profile that generated the content. At block 1306, the content curation server may determine a first content quality score associated with the user profile. The first content quality score may be indicative of an amount and/or quality of previous collaborative content generated by the user profile. The first content quality score may be determined based on one or more content quality parameters that may include, for example, a number of additional collaborative content items, each of which includes at least a portion of the collaborative content previously generated by the user profile, a number of edits made to the collaborative content previously generated by the user profile, a number of times the previously generated collaborative content was consumed (e.g., accessed and scrolled through), and so forth. Each content quality parameter may be assigned a weight indicative of its relative impact on the content quality score and the weighted content quality parameters may be used to generate the first content quality score for the user profile. For example, a first positive weight may be applied to the number of collaborative content items that include user-generated content associated with the user profile and a second negative weight may be applied to the number of edits made by other user profiles to the user-generated content associated with the user profile. The first and second weight may be aggregated (e.g., summed or otherwise used in a formula) to determine the first content quality score. In certain example embodiments, a second content quality score may also be generated for the content itself at block 1308.

At block 1310, the first content quality score may be compared to a first threshold value. The first threshold value may be determined based on various factors such as, for example, the "popularity" of the content to which the collaborative content relates (e.g., the number of e-book downloads, shares, or the like), the complexity of the content (e.g., a reading difficulty level associated with the content), the number of user profiles that have previously edited the collaborative content item, or the like. The first threshold value may be increased or decreased based on these various parameters. For example, the first threshold value may be higher for content that is more "popular" or collaborative content that has been edited more times. If the first content quality score exceeds the first threshold value, the content generated by the user profile may be determined to be of sufficient quality and, at block 1318, the content and an indication of the word or phrase to which the content relates (or an indication (e.g., an identifier) of an existing collaborative content item for the word or phrase) may be sent to one or more user devices such as, for example, each user device storing the digital content. If, on the other hand, the first content quality score does not exceed the first threshold value, the content may be sent at block 1314 for a content curation process to be performed on the content.

In those example embodiments in which the second content quality score is generated, a determination may be made at block 1312 as to whether the second content quality score exceeds a second threshold value. The second threshold value may be determined based on any of the parameters discussed earlier in relation to the first threshold value. If the second content quality score is determined to exceed the second threshold value, the content may be sent to one or more user devices storing the digital content at block 1318. On the other hand, if the second content quality score for the content does not exceed the second threshold value, the content curation process may be performed on the content at block 1314.

In certain example embodiments, a user may manually curate the content, while in other example embodiments, an automated script or algorithm may be executed to curate the content. After curation, the content curation server may determine whether the curated content is acceptable for inclusion in a collaborative content item for the associated word or phrase. This determination may be based on a manual assessment by a user or an automated output generated as a result of execution of the automated script or algorithm.

At block 1316, a determination may be made as to whether the curated content is acceptable for delivery. If it is determined that the curated content is acceptable for delivery, the curated content and an indication of the word or phrase or an indication of an existing collaborative content item for the phrase or word may be sent, at block 1318, to one or more user devices storing the digital content. If the curated content is not deemed acceptable, it may be rejected and a notification that the content has been rejected may be sent to the user device from which the content was received at block 1320.

Figure 14:
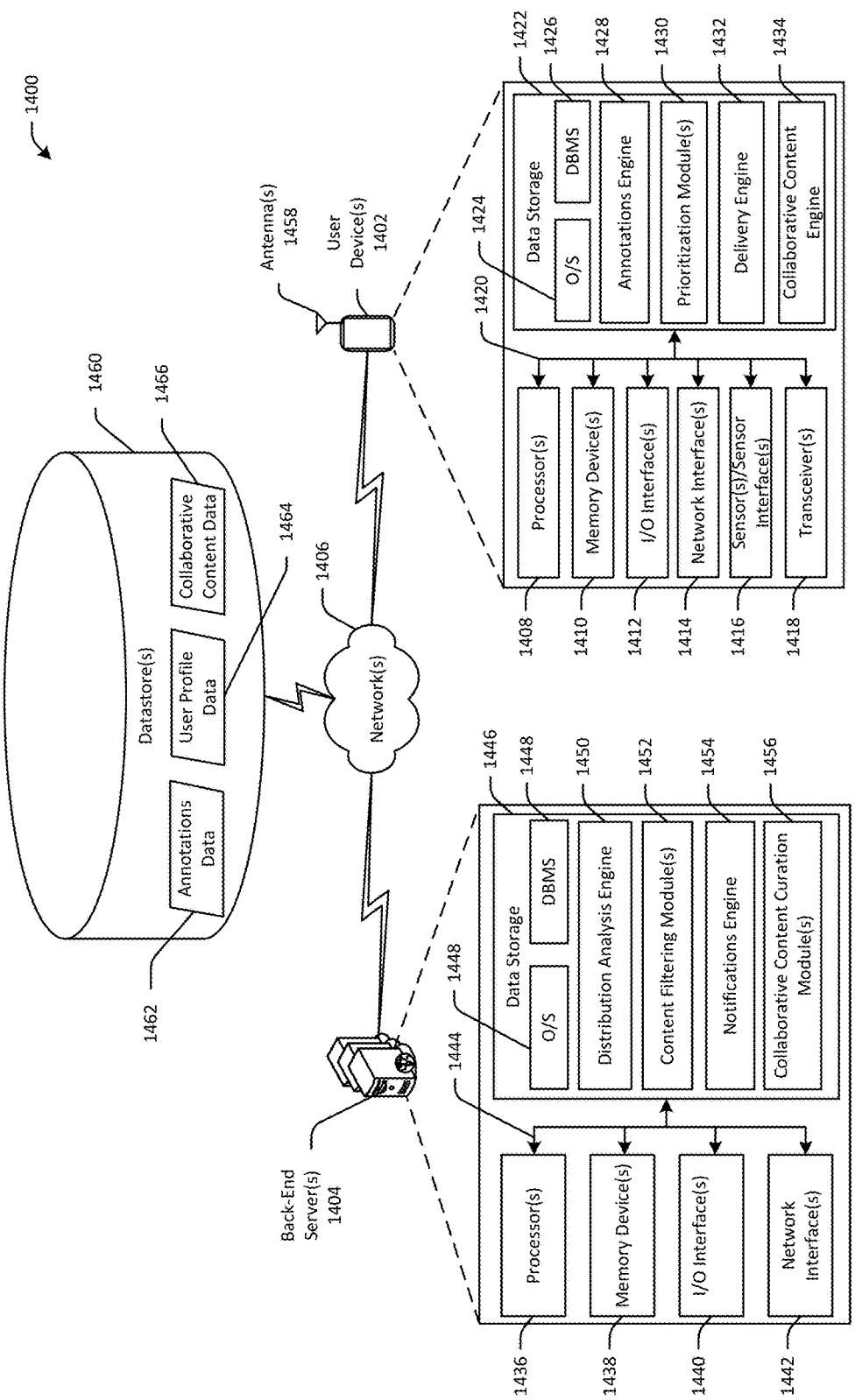
FIG. 14 is a schematic diagram of an illustrative networked architecture in accordance with one or more example embodiments of the disclosure.

FIG. 14 is a schematic diagram of an illustrative networked architecture 1400 in accordance with one or more example embodiments of the disclosure. The networked architecture 1400 may include one or more user devices 1402 and one or more back-end servers 1404 configured to communicate with one another via one or more networks 1406. The back-end server(s) 1404 may include one or more distribution servers 508 and/or one or more content curation servers. While the user device(s) 1402 and the back-end server(s) 1404 may be described herein in the singular, it should be appreciated that multiple user devices 1402 and/or multiple back-end servers 1404 may form part of the architecture 1400.

The network(s) 1406 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 1406 may have any suitable communication range associated therewith and may include, for example, global networks (e.g., the Internet), metropolitan area networks (MANs), wide area networks (WANs), local area networks (LANs), or personal area networks (PANs). In addition, the network(s) 1406 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The user device 1402 may be any suitable device capable of rendering digital content such as e-book content including, without limitation, an e-reader, a smartphone, a tablet device, a personal digital assistant, a wearable computing device, or the like. In an illustrative configuration, the device 1402 may include one or more processors (processor(s)) 1408, one or more memory devices 1410 (generically referred to herein as memory 1410), one or more input/output ("I/O") interface(s) 1412, one or more network interfaces 1414, one or more sensors or sensor interfaces 1416, one or more transceivers 1418, and data storage 1422. The device 1402 may further include one or more buses 1420 that functionally couple various components of the device 1402. The device 1402 may further include one or more antennas 1458 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1420 may include at least one of a system bus, a memory bus, an address bus, or a message bus, and may permit exchange of information (e.g., data (including computer-executable code), signaling, etc.) between various components of the device 1402. The bus(es) 1420 may include, without limitation, a memory bus or a memory controller, a peripheral bus, an accelerated graphics port, and so forth. The bus(es) 1420 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1410 of the device 1402 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1410 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1410 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1422 may include removable storage and/or non-removable storage including, but not limited to, magnetic storage, optical disk storage, and/or tape storage. The data storage 1422 may provide non-volatile storage of computer-executable instructions and other data. The memory 1410 and the data storage 1422, removable and/or non-removable, are examples of computer-readable storage media (CRSM) as that term is used herein.

The data storage 1422 may store computer-executable code, instructions, or the like that may be loadable into the memory 1410 and executable by the processor(s) 1408 to cause the processor(s) 1408 to perform or initiate various operations. The data storage 1422 may additionally store data that may be copied to memory 1410 for use by the processor(s) 1408 during the execution of the computer-executable instructions. Moreover, output data generated as a result of execution of the computer-executable instructions by the processor(s) 1408 may be stored initially in memory 1410, and may ultimately be copied to data storage 1422 for non-volatile storage.

More specifically, the data storage 1422 may store one or more operating systems (O/S) 1424; one or more database management systems (DBMS) 1426 and one or more program modules, applications, engines, or the like such as, for example, an annotations engine 1428, one or more prioritization modules 1430, a delivery engine 1432, and a collaborative content engine 1434. Any of the program modules, applications, engines, or the like may include one or more sub-modules, sub-applications, sub-engines, or the like. Further, any of the modules depicted in FIG. 14 may include computer-executable code, instructions, or the like that may be loaded into the memory 1410 for execution by one or more of the processor(s) 1408. Further, any data stored in the data storage 1422 may be loaded into the memory 1410 for use by the processor(s) 1408 in executing computer-executable code. In addition, any data potentially stored in one or more datastores 1460 may be accessed via the DBMS 1426 and loaded in the memory 1410 for use by the processor(s) 1408 in executing computer-executable code.

The processor(s) 1408 may be configured to access the memory 1410 and execute computer-executable instructions loaded therein. For example, the processor(s) 1408 may be configured to execute computer-executable instructions of the various program modules of the user device 1402 to cause or facilitate various operations to be performed in accordance with one or more embodiments of the disclosure. The processor(s) 1408 may include any suitable processing unit capable of accepting data as input, processing the input data in accordance with stored computer-executable instructions, and generating output data. The processor(s) 1408 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1408 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1408 may be capable of supporting any of a variety of instruction sets.

Referring now to other illustrative components depicted as being stored in the data storage 1422, the O/S 1424 may be loaded from the data storage 1422 into the memory 1410 and may provide an interface between other application software executing on the device 1402 and hardware resources of the device 1402. More specifically, the O/S 1424 may include a set of computer-executable instructions for managing hardware resources of the device 1402 and for providing common services to other application programs (e.g., managing memory allocation among various application programs). In certain example embodiments, the O/S 1424 may control execution of one or more of the program modules depicted as being stored in the data storage 1422. The O/S 1424 may include any operating system now known or which may be developed in the future including, but not limited to, any server operating system, any mainframe operating system, or any other proprietary or non-proprietary operating system.

The DBMS 1426 may be loaded into the memory 1410 and may support functionality for accessing, retrieving, storing, and/or manipulating data stored in the memory 1410 and/or data stored in the data storage 1422. The DBMS 1426 may use any of a variety of database models (e.g., relational model, object model, etc.) and may support any of a variety of query languages. The DBMS 1426 may access data represented in one or more data schemas and stored in any suitable data repository such as, for example, the datastore(s) 1460. In those example embodiments in which the device 1402 is a mobile device, the DBMS 1426 may be any suitable light-weight DBMS optimized for performance on a mobile device.

The datastore(s) 1460 may include, but are not limited to, databases (e.g., relational, object-oriented, etc.), file systems, flat files, distributed datastores in which data is stored on more than one node of a computer network, peer-to-peer network datastores, or the like. The datastore(s) 1460 may include annotations data 1462, user profile data 1464, and collaborative content data 1466.

Referring now to other illustrative components of the device 1402, the input/output (I/O) interface(s) 1412 may facilitate the receipt of input information by the device 1402 from one or more I/O devices as well as the output of information from the device 1402 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 1402 or may be separate. The I/O devices may further include, for example, any number of peripheral devices such as data storage devices, printing devices, and so forth.

The I/O interface(s) 1412 may also include an interface for an external peripheral device connection such as universal serial bus (USB), FireWire, Thunderbolt, Ethernet port or other connection protocol that may connect to one or more networks. The I/O interface(s) 1412 may also include a connection to one or more of the antenna(s) 1458 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The device 1402 may further include one or more network interfaces 1414 via which the device 1402 may communicate with any of a variety of other systems, platforms, networks, devices, and so forth. Such communication may occur via one or more of the network(s) 1406.

The antenna(s) 1458 may include any suitable type of antenna depending, for example, on the communications protocols used to transmit or receive signals via the antenna(s) 1458. Non-limiting examples of suitable antennas may include directional antennas, non-directional antennas, dipole antennas, folded dipole antennas, patch antennas, multiple-input multiple-output (MIMO) antennas, or the like. The antenna(s) 1458 may be communicatively coupled to one or more transceivers 1418 or radio components to which or from which signals may be transmitted or received.

As previously described, the antenna(s) 1458 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 1458 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the antenna(s) 1458 may be configured to transmit or receive radio frequency signals within any suitable frequency range forming part of the unlicensed portion of the radio spectrum.

The antenna(s) 1458 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1418 may include any suitable radio component(s) for—in cooperation with the antenna(s) 1458—transmitting or receiving radio frequency (RF) signals in the bandwidth and/or channels corresponding to the communications protocols utilized by the device 1402 to communicate with other devices. The transceiver(s) 1418 may include hardware, software, and/or firmware for modulating, transmitting, or receiving—potentially in cooperation with any of antenna(s) 1458—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1418 may further include hardware, firmware, or software for receiving GNSS signals. The transceiver(s) 1418 may include any known receiver and baseband suitable for communicating via the communications protocols utilized by the device 1402. The transceiver(s) 1418 may further include a low noise amplifier (LNA), additional signal amplifiers, an analog-to-digital (A/D) converter, one or more buffers, a digital baseband, or the like.

The sensor(s)/sensor interface(s) 1416 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program modules, applications, computer-executable instructions, code, or the like depicted in FIG. 14 as being stored in the data storage 1422 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device 1402, and/or hosted on other computing device(s) accessible via one or more networks, may be provided to support functionality provided by the program modules, applications, or computer-executable code depicted in FIG. 14 and/or additional or alternate functionality. Further, functionality may be modularized differently such that processing described as being supported collectively by the collection of program modules depicted in FIG. 14 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 14 may be implemented, at least partially, in hardware and/or firmware across any number of devices.

It should further be appreciated that the device 1402 may include alternate and/or additional hardware, software, or firmware components beyond those described or depicted without departing from the scope of the disclosure. More particularly, it should be appreciated that software, firmware, or hardware components depicted as forming part of the device 1402 are merely illustrative and that some components may not be present or additional components may be provided in various embodiments. While various illustrative program modules have been depicted and described as software modules stored in data storage 1422, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the methods 800-1300 may have been described above as being performed by one or more devices of the architecture 1400, or more specifically, by one or more engines, program modules, applications, or the like executable on such devices, such as the user device 1402 having the illustrative configuration shown in FIG. 14 or the back-end server 1404 having the illustrative configuration shown in FIG. 14. It should be appreciated, however, that such operations may be implemented in connection with numerous other device configurations.

The operations described and depicted in the illustrative methods of FIGS. 8-13 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 8-13 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
determining that a word or phrase appears at least a threshold number of times in an electronic book, wherein the threshold number of times is greater than one;
determining, based at least partially on the determination that the word or phrase appears at least the threshold number of times in the electronic book, that a collaborative content item indicator is to be rendered in association with the word or phrase, wherein the collaborative content item indicator indicates that the word or phrase is a collaborative content item candidate;
receiving, from a first user device, an indication of a user selection of the collaborative content item indicator, wherein the electronic book is uneditable by at least the first user device;
receiving, from the first user device, a request to incorporate user-generated content for the collaborative content item candidate into collaborative content of a first collaborative content item, wherein the first collaborative content item has been edited by multiple user profiles;

determining a first user profile associated with generation of the user-generated content;
determining a number of additional collaborative content items that incorporate additional user-generated content associated with the first user profile;
determining a number of times the additional user-generated content has been edited;
determining a content quality score associated with the first user profile, wherein determining the content quality score comprises:
assigning a first positive weight determined by the number of additional collaborative content items that include additional user-generated content associated with the first user profile;
assigning a second negative weight determined by the number of times the additional user-generated content has been edited; and
determining the content quality score using the first positive weight and the second negative weight;
determining that the content quality score exceeds a threshold value;
determining that the user-generated content is acceptable for incorporation into the first collaborative content item;
modifying the first collaborative content item based on the collaborative content item candidate, the user-generated content, and the content quality score; and
sending a notification to a second user device associated with a second user profile, the notification including: i) the user-generated content, and ii) at least one of an identifier of the first collaborative content item or anchor data including a position identifier that indicates a location of the word or phrase in the electronic book in relation to other content of the electronic book, wherein the user-generated content from the notification is configured for incorporation into a second collaborative content item of the second user device, and wherein the second collaborative content item is configured for rendering in association with the electronic book.

2. The method of claim 1, wherein the user-generated content is first user-generated content and the content quality score is a first content quality score, the method further comprising:
receiving, from a third user device, a request to incorporate second user-generated content into the collaborative content of the first collaborative content item;
determining a third user profile associated with generation of the second user-generated content;
determining a second content quality score associated with the third user profile;
determining that the second content quality score is below the threshold value; and
determining that a content curation process is to be applied to the second user-generated content, the content curation process comprising applying a content filter to the second user-generated content, wherein applying the content filter comprises editing at least a portion of the second user-generated content.

3. The method of claim 2, further comprising:
determining that the second user-generated content is acceptable for incorporation into the collaborative content of the first collaborative content item after the second user-generated content has been curated;
causing the second user-generated content to be added to the collaborative content of the first collaborative content item; and sending: i) the second user-generated content, and ii) the identifier of the first collaborative content item or the anchor data to the first user device and the second user device.

4. A method, comprising:
determining that a word or phrase appears at least a threshold number of times in an electronic book, wherein the threshold number of times is greater than one;
determining, based at least partially on the determination that the word or phrase appears at least the threshold number of times in the electronic book, that a collaborative content item indicator is to be rendered in association with the word or phrase, wherein the collaborative content item indicator indicates that the word or phrase is a collaborative content item candidate;
receiving, from a first user device, an indication of a user selection of the collaborative content item indicator;
receiving, from the first user device, user-generated content for the collaborative content item candidate;
determining a first user profile associated with the user-generated content;
determining a content quality score associated with the first user profile, wherein determining the content quality score includes determining at least one of: (a) a number of additional collaborative content items that include additional user-generated content associated with the first user profile, or (b) a number of times the additional user-generated content has been edited;
determining that the content quality score exceeds a threshold value;
determining that the user-generated content for the collaborative content item candidate is acceptable for inclusion in a first collaborative content item;
modifying the first collaborative content item based at least in part on the collaborative content item candidate and the user-generated content; and
sending the user-generated content to a second user device associated with a second user profile, wherein the user-generated content is configured for incorporation into a second collaborative content item of the second user device, and wherein the second collaborative content item is configured for rendering in association with digital content.

5. The method of claim 4, wherein determining the content quality score comprises:
determining a content quality parameter for the additional user-generated content associated with the first user profile;
assigning a weighted value to the content quality parameter; and
determining the content quality score using the weighted value.

6. The method of claim 5, wherein the content quality parameter corresponds to at least one of: i) the number of additional collaborative content items, ii) a number of edits made to the additional user-generated content, or iii) a number of times the additional user-generated content was consumed.

7. The method of claim 4, wherein the user-generated content is first user-generated content and the content quality score is a first content quality score, the method further comprising:
receiving, from a third user device, second user-generated content for the first collaborative content item;
determining a third user profile associated with the second user-generated content;

determining a second content quality score associated with the third user profile;
determining that the second content quality score is below the threshold value; and
determining that the second user-generated content is to be curated.

8. The method of claim 7, further comprising:
determining that the second user-generated content is acceptable for inclusion in the first collaborative content item after the second user-generated content has been curated; and
sending the second user-generated content to the first user device and the second user device.

9. The method of claim 4, wherein the content quality score is a first content quality score and the threshold value is a first threshold value, the method further comprising:
determining a second content quality score associated with the user-generated content; and
determining that the second content quality score exceeds a second threshold value.

10. The method of claim 4, further comprising determining the word or phrase from a set of candidate words or phrases associated with the digital content.

11. The method of claim 4, wherein the user-generated content comprises an edit to existing content included in the first collaborative content item.

12. The method of claim 4, wherein the digital content is a first electronic book, the method further comprising:
determining that the word or phrase is referenced in a second electronic book;
generating a third collaborative content item comprising the user-generated content; and
sending the third collaborative content item to a third user device storing the second electronic book.

13. The method of claim 4, wherein sending the user-generated content to the second user device comprises sending a notification comprising: i) the user-generated content, and ii) at least one of an identifier of the first collaborative content item or anchor data comprising position identifiers that indicate a location of the word or phrase in the digital content in relation to other content of the digital content.

14. The method of claim 4, further comprising:
determining a number of instances that the word or phrase appears in third-party content referencing the digital content;
determining that the number of instances exceeds the threshold number of times; and
sending a notification to the first user device that the word or phrase is a candidate word or phrase for the collaborative content item candidate.

15. The method of claim 4, further comprising:
determining first position identifiers associated with a first location of the word or phrase in the digital content;
determining second position identifiers associated with a second location of the word or phrase in the digital content;
determining a portion of the digital content located between the first position identifiers and the second position identifiers;
generating modified user-generated content based at least in part on the user-generated content and the portion of the digital content;
generating a third collaborative content item corresponding to the word or phrase, the third collaborative content item including the modified user-generated content; and sending a notification to the first user device and the second user device, the notification indicating that the third collaborative content item is associated with the first position identifiers and the first collaborative content item is associated with the second position identifiers.

16. The method of claim 4, further comprising sending a notification to the first user device that the user-generated content has been accepted for inclusion in the first collaborative content item.

17. An electronic device, comprising:
at least one memory storing digital content and computer-executable instructions, wherein the digital content is stored in association with a first user profile;
a display; and
at least one processor operatively coupled to the display and the at least one memory, wherein the at least one processor is configured to access the at least one memory and execute the computer-executable instructions to:
determine that a word or phrase appears at least a threshold number of times in an electronic book, wherein the threshold number of times is greater than one;
determine, based at least partially on the determination that the word or phrase appears at least the threshold number of times in the electronic book, that a collaborative content item indicator is to be rendered in association with the word or phrase, wherein the collaborative content item indicator indicates that the word or phrase is a collaborative content item candidate;
receive a collaborative content item for the collaborative content item candidate that includes first user-generated content;
receive a notification comprising second user-generated content, wherein the electronic book is uneditable by users;
modify the collaborative content item to include the second user-generated content;
render a portion of the digital content on the display;
render the collaborative content item indicator indicating that the collaborative content item is associated with a word or phrase in the portion of the digital content, wherein the collaborative content item includes the first user-generated content corresponding to the word or phrase and the second user-generated content, and wherein the second user-generated content was generated in association with a second user profile;
receive first user input indicating a user selection of the collaborative content item indicator; and
receive second user input indicating a request to incorporate third user-generated content for the word or phrase into the collaborative content item.

18. The electronic device of claim 17, wherein the at least one processor is further configured to execute the computer-executable instructions to:
receive third user input indicating a request to edit the first user-generated content;
receive fourth user-generated content comprising one or more changes to the first user-generated content;
send the fourth user-generated content to a content curation server;
receive a notification that the fourth user-generated content has been accepted for inclusion in the collaborative content item; and modify the collaborative content item to include the fourth user-generated content.

19. The electronic device of claim 17, wherein the word or phrase is a first word or phrase and the collaborative content item is a first collaborative content item, and wherein the at least one processor is further configured to execute the computer-executable instructions to:
- determine a second word or phrase in the digital content;
- display a prompt for fourth user-generated content corresponding to the second word or phrase;
- receive the fourth user-generated content;
- send the fourth user-generated content to a content curation server;
- receive a notification that the fourth user-generated content has been authorized; and
- generate a second collaborative content item corresponding to the second word or phrase, the second collaborative content item including the fourth user-generated content.

20. The electronic device of claim 19, wherein the at least one processor is further configured execute the computer-executable instructions to determine the second word or phrase from a set of candidate words or phrases associated with the digital content.

* * * * *